United States Patent
Cariou et al.

(10) Patent No.: US 10,728,750 B2
(45) Date of Patent: Jul. 28, 2020

(54) APPARATUS, SYSTEM AND METHOD OF COMMUNICATION OVER A 6 GIGAHERTZ (GHZ) WIRELESS FREQUENCY BAND

(71) Applicant: INTEL IP CORPORATION, Santa Clara, CA (US)

(72) Inventors: Laurent Cariou, Portland, OR (US); Robert Stacey, Portland, OR (US); Thomas J. Kenney, Portland, OR (US); Yaron Alpert, Hod HaSharon (IL); Ehud Reshef, Qiryat Tivon (IL)

(73) Assignee: INTEL IP CORPORATION, Santa Clara, CA (US)

( * ) Notice: Subject to any disclaimer, the term of this patent is extended or adjusted under 35 U.S.C. 154(b) by 25 days.

(21) Appl. No.: 16/233,384

(22) Filed: Dec. 27, 2018

(65) Prior Publication Data

US 2019/0132729 A1    May 2, 2019

Related U.S. Application Data

(60) Provisional application No. 62/614,178, filed on Jan. 5, 2018, provisional application No. 62/710,358, filed on Feb. 16, 2018.

(51) Int. Cl.
| | |
|---|---|
| H04W 12/00 | (2009.01) |
| H04W 52/14 | (2009.01) |
| H04L 29/06 | (2006.01) |
| H04W 24/10 | (2009.01) |

(Continued)

(52) U.S. Cl.
CPC ......... *H04W 12/007* (2019.01); *H04L 63/306* (2013.01); *H04W 24/08* (2013.01); *H04W 24/10* (2013.01); *H04W 52/143* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 2018/0368057 A1* | 12/2018 | Asterjadhi | H04W 48/10 |
| 2019/0159042 A1* | 5/2019 | Tomeba | H04B 7/0626 |
| 2019/0230521 A1* | 7/2019 | Tomeba | H04B 7/06 |

OTHER PUBLICATIONS

Makris, Nikos et al. "Measuring LTE and WiFi coexistence in Unlicensed spectrum." 2017 European Conference on Networks and Communications. Jun. 2017. IEEE. 6 pages.*

(Continued)

*Primary Examiner* — Jeffrey R Swearingen
(74) *Attorney, Agent, or Firm* — Shichrur & Co.

(57) ABSTRACT

Some demonstrative embodiments include apparatuses, devices, systems and methods of communication over a 6 Gigahertz (GHz) wireless frequency band. For example, an apparatus may be configured to cause a licensed 6 GHz wireless communication device, which is licensed by a regulatory authority to communicate over a wireless communication channel in the 6 GHz wireless frequency band, to detect in a transmission over the wireless communication channel in the 6 GHz wireless frequency band an identifier of an unlicensed 6 GHz wireless communication station (STA), which is not licensed by the regulatory authority to communicate over the 6 GHz wireless frequency band; and to send a report comprising the identifier of the unlicensed 6 GHz STA.

25 Claims, 5 Drawing Sheets

(51) Int. Cl.
*H04W 24/08* (2009.01)
*H04W 16/14* (2009.01)

(56) References Cited

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

APPARATUS, SYSTEM AND METHOD OF COMMUNICATION OVER A 6 GIGAHERTZ (GHZ) WIRELESS FREQUENCY BAND

CROSS REFERENCE

This application claims the benefit of and priority from U.S. Provisional Patent Application No. 62/710,358 entitled "INTERFERENCE RESOLUTION MITIGATION TECHNIQUE", filed Feb. 16, 2018, and U.S. Provisional Patent Application No. 62/614,178 entitled "CHANNEL DISALLOW SIGNAL FOR 6 GIGAHERTZ UNLICENSED USE", filed Jan. 5, 2018, the entire disclosures of which are incorporated herein by reference.

TECHNICAL FIELD

Embodiments described herein generally relate to communication over a 6 Gigahertz (GHz) wireless frequency band.

BACKGROUND

A licensed 6 Gigahertz (GHz) wireless communication device may be licensed by a regulatory authority to communicate over a wireless communication channel in a 6 GHz wireless frequency band.

There is a need for technical solutions to support communication of unlicensed 6 GHz wireless communication stations (STAs), which may not be licensed by the regulatory authority to communicate over the 6 GHz wireless frequency band.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
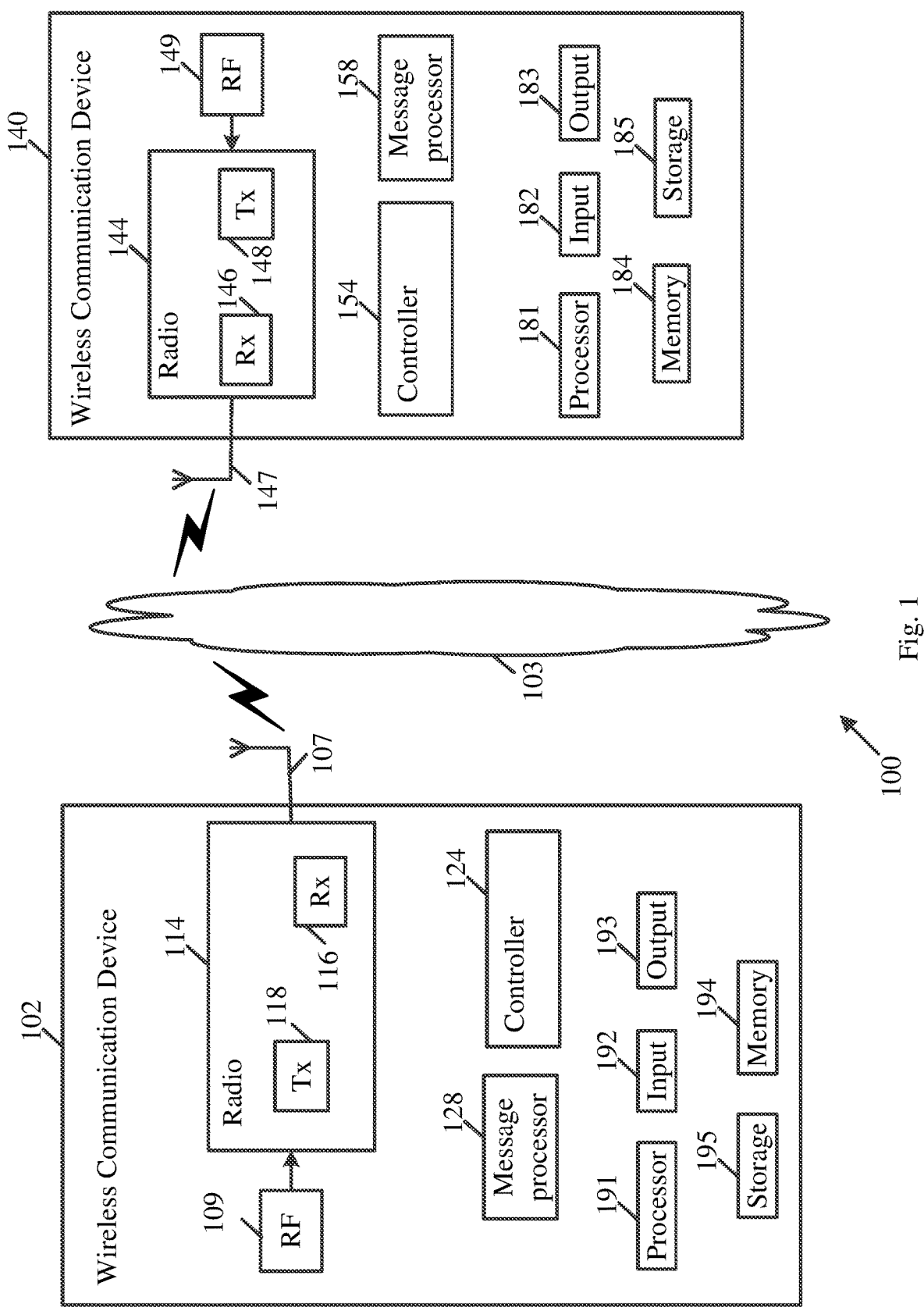
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks— Specific requirements Part* 11: *Wireless LAN Medium Access Control (MAC) and Physical Layer (PHY) Specifications,* Dec. 7, 2016)) and/or future versions and/or derivatives thereof, devices and/or networks operating in accordance with existing WFA Peer-to-Peer (P2P) specifications (*WiFi P2P technical specification,* version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 6 GHz, 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, device 102 may include at least one STA, and/or device 140 may include at least one STA.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more Neighbor Awareness Networking (NAN) STAs.

In some demonstrative embodiments, device 140 may include, operate as, and/or perform the functionality of an AP STA e.g., as described below.

In some demonstrative embodiments, device 140 may include, operate as, and/or perform the functionality of a non-AP STA, e.g., as described below.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 6 Gigahertz (GHz) frequency band, a 2.4 GHz frequency band or a 5 GHz frequency band, a milli-meterWave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102, and/or 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 6 GHz band, a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, one or more functionalities of controller 124 may be implemented as part of any other element of device 102, and/or one or more functionalities of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into PHY Protocol Data Unit (PPDU), e.g., a PLCP PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, one or more functionalities of message processor 128 may be implemented as part of any other element of device 102, and/or one or more functionalities of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments, devices 102 and/or 140 may be configured to communicate over one or more channels in a 6 GHz wireless frequency band, for example, as part of one or more 6 GHz wireless networks, e.g., as described below.

In some demonstrative embodiments device 102 and/or device 140 may be configured to communicate over one or more additional networks over one or more additional frequency bands, e.g., a 2.4 GHz wireless network, or a 5 GHz wireless network, an mmWave network, an S1G network, a cellular network, and/or any other network over any other frequency band.

In some demonstrative embodiments, device 102 and/or device 140 may be configured to operate in accordance with one or more Specifications, for example, including one or more IEEE 802.11 Specifications, e.g., an IEEE 802.11-2016 Specification, an IEEE 802.11ax Specification, and/or any other specification and/or protocol.

In some demonstrative embodiments, device 102 and/or device 140 may be configured to operate over a multiple bands, for example, including two or more bands of the 6 GHz band, the 2.4 GHz band, and/or the 5 GHz band.

In some demonstrative embodiments, device 102 may include a licensed 6 GHz wireless communication device (also referred to as an "incumbent"), which is licensed by a regulatory authority to communicate over a wireless communication channel in a 6 GHz wireless frequency band, e.g., as described below.

In some demonstrative embodiments, device 140 may include an unlicensed 6 GHz wireless communication station (STA), which is not licensed by the regulatory authority to communicate over the 6 GHz wireless frequency band.

In some demonstrative embodiments, device 140 may include an AP, e.g., as described below.

In some demonstrative embodiments, device 140 may include a non-AP STA, which may be, for example, associated with an AP, e.g., as described below.

In some demonstrative embodiments, devices 102 and 140 may be configured to implement one or more mechanisms, operations, communications and/or protocols to provide a technical solution to support communication of an unlicensed 6 GHz STA, e.g., device 140, over the 6 GHz wireless frequency band, e.g., as described below.

For example, a regulatory authority, e.g., the Federal Communications Commission (FCC) and or any other regulatory authority, may extend the use of the 6 GHz frequency band, for example, for unlicensed mobile communications, e.g., to meet an increasing wireless spectrum demand.

In some demonstrative embodiments, one or more activities may be preformed to open the 6 GHz wireless frequency band, e.g., a new wireless frequency band, for unlicensed operation between 6 GHz and 7 GHz wireless frequency bands.

In some demonstrative embodiments, a 2-step approach may be followed to introduce WiFi operation in the 6 GHZ wireless frequency band, for example, between the 6 GHz and 7 GHz wireless frequency bands.

In some demonstrative embodiments, a first step or stage may include using one or more operations in accordance with an IEEE 802.11ax standard in the 6 GHZ wireless frequency band, for example, by defining a new channelization for the wireless frequency band.

In some demonstrative embodiments, the first step may provide a standard that may provide a very short time to market, and may show a quick readiness, e.g., to regulators. At this stage, it may not be required to change some or all hardware, e.g., compared to a hardware in accordance with the IEEE 802.11ax standard in lower bands, and/or only some software and/or management changes may be done.

In some demonstrative embodiments, the second step may define a new Greenfield, or almost Greenfield, Wi-Fi standard in the 6 GHZ wireless frequency band, which may be defined, for example, as part of a next generation Wi-Fi standardization effort, e.g., a Next Best Thing (NBT) standardization effort.

In some demonstrative embodiments, there may be one or more benefits in removing legacy devices and/or one or more legacy behaviors, and starting a new design with an improved PHY, for example, to adapt to one or more requirements of the 6 GHZ wireless frequency band, and/or to enable operation of incumbents that need protection, and/or an improved MAC, for example, to improve scheduling, spatial reuse, predictability and/or the like.

In some demonstrative embodiments, a technical solution, e.g., to be applied in the first step and/or which may be reused in the second step, may be to define an enabling method, for example, to allow STAs to access the 6 GHZ wireless frequency band, while respecting one or more regulation constraints, e.g., as described below.

In some demonstrative embodiments, simulations and measurements, for example, for indoor use, show that an interference generated by Wi-Fi devices on fixed incumbents may be very low, e.g., lower than an Interference To Noise (I/N) threshold as may be set by the FCC. Accordingly, it may be assumed that for an indoor use there may be no need for complex solutions such as database access, e.g., to support selective access to the 6 GHZ wireless frequency band.

In some demonstrative embodiments, it may be beneficial to avoid a location-based-database access requirement for 6

GHz band unlicensed access, for example, in order to enable WiFi products, which are cost sensitive, to reach the WiFi market.

However, some simulations show that in some scenarios, even if very rare, an interference of an unlicensed WiFi device may be above the I/N threshold. For example, an interference from the WiFi device may be above the IN threshold, for example, in a scenario at which a Wi-Fi device is indoor but in front of a window in high floors facing a fixed incumbent receiver.

In some demonstrative embodiments, devices 102 and 140 may be configured according to a technical solution to allow STAs to access the 6 GHZ wireless frequency band, for example, as long as the STAs do not cause an interference, which may be above the I/N threshold, e./g., as described below.

In some demonstrative embodiments, devices 102 and 140 may be configured according to a technical solution for supporting communication by unlicensed 6 GHz devices, which may be simple, reliable and/or may not require a location-based-database access, e./g., as described below.

In some demonstrative embodiments, devices 102 and 140 may be configured according to a technical solution for supporting communication by unlicensed 6 GHz devices, which may ensure incumbents that they will be sufficiently protected, e.g., from interference from a WiFi device, and/or that may support a procedure to cancel the interference, e.g., when interference occurs, e./g., as described below.

In some demonstrative embodiments, devices 102 and 140 may be configured according to a technical solution for supporting communication by unlicensed 6 GHz devices, for example, even without relying on a geolocation database and/or geolocation information, for example, where every device would be required to provide its geolocation to the database, e.g., to derive channels that the device can use in that geolocation without interfering with incumbents.

In some demonstrative embodiments, devices 102 and 140 may be configured according to a technical solution for supporting communication by unlicensed 6 GHz devices, for example, even without forcing unlicensed 6 GHz devices to have geolocation support and/or to be connected to the Internet, which may increase cost structure for wireless products of an indoor retail market.

In some demonstrative embodiments, devices 102 and 140 may implement a procedure, which may allow protecting incumbents, e.g., device 102, for example, even without having to define a geolocation-based database system, e.g., as descried below.

In some demonstrative embodiments, the procedure may not require using of geolocation support in the Wi-Fi devices, e.g., as descried below.

In some demonstrative embodiments, the procedure may reduce a complexity of a protocol and/or may reduce a cost of a wireless device.

In some demonstrative embodiments, a licensed 6 GHz device, e.g., device 102, may be configured to detect and report an interferer device, e.g., as described below.

In some demonstrative embodiments, controller 124 may be configured to trigger, cause, instruct and/or control device 102 to detect in a transmission over a wireless communication channel in a 6 GHz wireless frequency band an Identifier (ID) of an unlicensed 6 GHz STA, which is not licensed by the regulatory authority to communicate over the 6 GHz wireless frequency band, e.g., as described below.

In some demonstrative embodiments, controller 124 may be configured to trigger, cause, instruct and/or control device 102 to send a report including the identifier of the unlicensed 6 GHz STA, e.g., as described below.

In some demonstrative embodiments, controller 124 may be configured to trigger, cause, instruct and/or control device 102 to communicate over the wireless communication channel in the 6 GHz wireless frequency band according to a first wireless communication technology, for example, a "licensed" technology, and to process the transmission according to a second wireless communication technology different from the first wireless communication technology, for example, an "unlicensed" technology, e.g., as described below.

In one example, device 102 may communicate over the wireless communication channel in the 6 GHz wireless frequency band according to an incumbent technology, and may process the transmission according to a WiFi waveform technology. In other embodiments, any other additional or alternative wireless communication technologies may be implemented.

In some demonstrative embodiments, the detected transmission may be from the unlicensed 6 GHz STA. For example, the detected transmission may be from device 140. According to this example, device 102 may detect an identifier of device 140 in the transmission from device 140 over the wireless communication channel in the 6 GHz wireless frequency band, e.g., as described below.

In some demonstrative embodiments, the transmission may include a Media Access Control (MAC) control frame according to an Institute of Electrical and Electronics Engineers (IEEE) 802.11 Standard, e.g., as described below.

In some demonstrative embodiments, the transmission may include a Physical layer (PHY) Protocol Data Unit (PPDU), e.g., as described below.

In other embodiments, the transmission may include any other type of message, frame, or packet.

In some demonstrative embodiments, the identifier may include a certified identifier signed by the regulatory authority, e.g., as described below.

In some demonstrative embodiments, the identifier may include a Basic Service Set Identifier (BSSID), and or any other identifier, of an AP, e.g., as described below.

In some demonstrative embodiments, the identifier may include a BSSID, and/or any other identifier, of an AP associated with the unlicensed 6 GHz STA.

In other embodiments, the identifier may include any other additional or alternative type of identifier.

In some demonstrative embodiments, the unlicensed 6 GHz STA may include an AP, and the identifier may include a BSSID of the AP, e.g., as described below. For example, device 140 may include an AP and the detected transmission from device 140 may include a BSSID of device 140.

In some demonstrative embodiments, the unlicensed 6 GHz STA may be associated with an AP, and the identifier may include a BSSID of the AP, e.g., as described below. For example, device 140 may be associated with an AP, and the detected transmission from device 140 may include a BSSID of the associated AP.

In some demonstrative embodiments, controller 124 may be configured to trigger, cause, instruct and/or control device 102 to select to send the report based on a detected power of the transmission, e.g., as described below.

In other embodiments, controller 124 may be configured to trigger, cause, instruct and/or control device 102 to select to send the report based on any other additional or alternative criterion.

In some demonstrative embodiments, controller 124 may be configured to trigger, cause, instruct and/or control device 102 to send the report to a regulatory database of the regulatory authority, e.g., as described below.

In some demonstrative embodiments, controller 124 may be configured to transmit the report in a frame to the unlicensed 6 GHz STA over the wireless communication channel in the 6 GHz wireless frequency band, e.g., as described below.

In some demonstrative embodiments, controller 124 may be configured to transmit a broadcast transmission including the report over the wireless communication channel in the 6 GHz wireless frequency band, e.g., as described below.

In some demonstrative embodiments, the report may include a request that the unlicensed 6 GHz STA cease transmissions over the wireless communication channel in the 6 GHz wireless frequency band, e.g., as described below.

In some demonstrative embodiments, the report may include a duration indication to indicate a duration during which the unlicensed 6 GHz STA is to be prohibited from transmitting over the wireless communication channel in the 6 GHz wireless frequency band, e.g., as described below.

In some demonstrative embodiments, the report may include an indication of the wireless communication channel in the 6 GHz wireless frequency band, e.g., as described below.

In some demonstrative embodiments, an unlicensed 6 GHz STA, e.g., device 140, may be configured to transmit the transmission including the identifier, e.g., as described below.

In some demonstrative embodiments, controller 154 may be configured to trigger, cause, instruct and/or control device 140 to transmit over the wireless communication channel in the 6 GHz wireless frequency band, a transmission including the identifier to identify device 140, e.g., as described below.

In some demonstrative embodiments, controller 154 may be configured to trigger, cause, instruct and/or control device 140 to process authorization information from a database of the regulatory authority, e.g., as described below.

In some demonstrative embodiments, the authorization information may indicate whether or not the identifier is flagged for prohibiting transmissions over the wireless communication channel in the 6 GHz wireless frequency band.

In some demonstrative embodiments, controller 154 may be configured to select whether or not to prohibit device 140 from transmission over the wireless communication channel of the 6 GHz wireless frequency, for example, based on the authorization information, e.g., as described below.

In some demonstrative embodiments, controller 154 may be configured to prohibit device 140 from transmission over the wireless communication channel of the 6 GHz wireless frequency band, for example, when the authorization information indicates the identifier of device 140 is flagged for prohibiting transmissions over the wireless communication channel, e.g., as described below.

In some demonstrative embodiments, controller 154 may be configured to trigger, cause, instruct and/or control device 140 to access the database of the regulatory authority to receive the authorization information, e.g., as described below.

In some demonstrative embodiments, controller 154 may be configured to trigger, cause, instruct and/or control device 140 to process a message from the regulatory authority, the message including the authorization information, e.g., as described below.

In some demonstrative embodiments, controller 154 may be configured to trigger, cause, instruct and/or control device 140 to periodically transmit the transmission including the identifier over the wireless communication channel of the 6 GHz wireless frequency band, e.g., as described below.

In some demonstrative embodiments, the identifier may include an identifier, e.g., a BSSID, or any other identifier, of an AP, e.g., as described below.

In some demonstrative embodiments, device 140 may include an AP. According to these embodiments, controller 154 may be configured to trigger, cause, instruct and/or control device 140 to transmit the transmission including a BSSID of device 140.

In some demonstrative embodiments, device 140 may be associated with an AP. According to these embodiments, controller 154 may be configured to trigger, cause, instruct and/or control device 140 to transmit the transmission including a BSSID of the AP.

In some demonstrative embodiments, the transmission over the wireless communication channel in the 6 GHz wireless frequency band, e.g., from device 140, including the identifier of the unlicensed 6 GHz STA, may be configured according to one or more frame formats, e.g., as described below.

In some demonstrative embodiments, an unlicensed 6 GHz STA, e.g., device 140, may be configured to transmit a transmission including an identifier of the 6 GHz unlicensed STA, e.g., a unique identifier, according to a frame format of an IEEE802.11 PPDU.

In some demonstrative embodiments, the unlicensed 6 GHz STA, e.g., device 140, may be configured to transmit the transmission including the identifier of the 6 GHz unlicensed STA, for example, as part of a MAC frame.

In some demonstrative embodiments, the identifier may include a BSSID of a BSS, and the MAC frame may include at least the BSSID of the AP. The MAC frame may optionally also include a bandwidth and/or a list of channels on which the BSS operates (collectively referred to as BSS information").

In some demonstrative embodiments, the MAC frame may include a MAC public action frame type, which may carry the identifier and/or the BSS information. In other embodiments, the MAC frame may have any other type.

In some demonstrative embodiments, unlicensed 6 GHz STAs of a BSS, e.g., all STAs forming the BSS, e.g., including device 140, may transmit an identifier, e.g., a unique identifier of the BSS. For example, the unique identifier may include a BSSID of an AP of the BSS.

In some demonstrative embodiments, the unlicensed 6 GHz STAs of the BSS, e.g., all STAs forming the BSS, e.g., including device 140, may collect and/or identify the identifier information of the BSS, e.g., the BSSID, and/or the BSS information in a beacon from the AP, and/or from an association procedure with the AP.

In some demonstrative embodiments, one or more of the unlicensed 6 GHz STAs, e.g., device 140, may update the identifier information and/or the BSS information, e.g., in a MAC public action frame, for example, if there are any changes that occur in the AP side, such as, for example, changes in the BW and/or operating channels.

In some demonstrative embodiments, a licensed 6 GHz wireless communication device, e.g., device 102, may be configured as a reception-only device or a reception and transmission device, which may be capable of detecting and/or reporting transmissions of unlicensed 6 GHz STAs, e.g., as described below.

In some demonstrative embodiments, device 102 may be configured to detect an ID of an unlicensed interferer, e.g., device 140, that is transmitted over-the-air, for example, by every unlicensed device in the 6 GHz frequency band.

In some demonstrative embodiments, device 102 may be configured to inform the unlicensed interferer that it is interfering, e.g., as described below.

In some demonstrative embodiments, device 102 may be configured to force the unlicensed interferer to change wireless communication channel and/or to cease all activities in a 6 GHz channel on which it interferes, e.g., as described below.

In some demonstrative embodiments, informing the unlicensed interferer may be done through a database system, e.g., where an ID of the unlicensed interferer may be flagged as being interfering, and/or with a rule for any unlicensed device to regularly check the database to see if its ID got banned from a particular channel.

In some demonstrative embodiments, informing the unlicensed interferer may be done in a way that the database may directly push the update to the unlicensed device. This can be done through an over-the-air signal, which is either unicasted to a particular interferer, or broadcasted in a specific direction, and whoever receives the signal needs to stop transmitting.

In some demonstrative embodiments, devices 102 and/or 140 may be configured to implement one or more mechanisms to ensure low complexity and/or robustness to potential Denial of Service (DoS) attacks and to reduce possible ways of abuse, e.g., as described below.

In some demonstrative embodiments, devices 102 and/or 140 may support an interference mitigation mechanism including a transmission of an ID by the unlicensed device, e.g., device 140, and a mitigation by a victim incumbent, for example, by device 102, e.g., as described below.

In some demonstrative embodiments, an unlicensed 6 GHZ STA, for example, every unlicensed 6 GHZ device, e.g., device 140, when operating in a wireless communication channel in the 6 GHz wireless frequency band, may periodically transmit a signal carrying an identifier, for example, a unique identifier, e.g., as described below.

In some demonstrative embodiments, the identifier may be unique to a Basic Service Set (BSS), or to the unlicensed 6 GHZ STA itself.

In other embodiments, the identifier may be defined to be unique by any other criterion.

In some demonstrative embodiments, the identifier may be acquired by an AP, or by an unlicensed 6 GHZ STA that wants to operate on its own over the 6 GHz wireless frequency band, for example, by registering to a database system.

In some demonstrative embodiments, the identifier may include a BSSID, e.g., a MAC address, of the AP, or any other unique identifier.

In one example, the identifier may be the BSSID and may be transmitted in an IEEE802.11 MAC frame, for example, using an IEEE802.11 waveform for Wi-Fi.

In another example, a common technology-agnostic waveform and/or a common frame may be defined, e.g., to be used in other unlicensed technologies.

In some demonstrative embodiments, the ID may be signed by a regulatory authority.

In some demonstrative embodiments, a licensed 6 GHZ device, for example, every licensed 6 GHZ device, e.g., device 102, and/or incumbent operators, e.g., of the licensed 6 GHZ device, that may be experiencing an interference from an unlicensed 6 GHz device, e.g., an AP, operating over the 6 GHz wireless frequency band, e.g., in a specific receiver point, may install a sniffer in that receiver, for example, to detect a unique identifier, e.g., of the AP, and to identify the wireless radio, e.g., a radio LAN (RLAN), that is causing the interference.

In some demonstrative embodiments, the sniffer may be connected to an antenna of a receiver of the licensed 6 GHZ device, e.g., to have a same receiver orientation as an orientation of the receiver, and/or a same receiver gain as a gain of the receiver of the licensed 6 GHZ device.

In one example, a Wi-Fi sniffer may be used, for example, to detect an identifier for Wi-Fi, which may be transmitted by Wi-Fi devices using an IEEE802.11 waveform and an IEEE802.11 frame. According to this example, a 3GPP sniffer may also be installed at the licensed 6 GHZ device, e.g., at the same time.

In another example, a common signal may be defined across all unlicensed technologies. According to this example, a specific sniffer capable of detection of such signal may be used.

In some demonstrative embodiments, installation of the sniffer may be permanent, for example, if an incumbent wants protection all the time, or may be temporary, for example, if the sniffer is installed only to detect an issue and to solve it.

In some demonstrative embodiments, a licensed 6 GHZ device, for example, every licensed 6 GHZ device, e.g., device 102, and/or an incumbent operator, e.g., of the licensed 6 GHZ device, may detect a unique identifier of an interferer above a specific threshold in a sniffer connected to one of its receivers, and may be configured to contact the database, e.g., under supervision from the FCC, for example, to notify the database that the unique identifier is causing some interference.

In some demonstrative embodiments, the database may be updated in a way that the unique identifier may be flagged for the channel on which the interference was observed.

In some demonstrative embodiments, an unlicensed 6 GHZ STA, for example, every unlicensed 6 GHZ device, e.g., device 140, operating at the 6 GHz wireless frequency band, may be configured to access the database, for example, periodically, e.g., once a day or in any other periodicity, or all the time for example, in order to gather messages from the database. This technical solution may obviate usage of a geolocation based mechanism.

In some demonstrative embodiments, the unlicensed 6 GHZ STA may receive a notice if it got flagged, e.g., since the last time it checked the database, for example, based on its unique identifier provided to the database. In such case, the unlicensed 6 GHZ STA may be banned for transmissions in one or more channels that are identified as flagged by the database.

In some demonstrative embodiments, this ban may be valid indefinitely, or may have a specific duration, which may be indicated by the database and/or in regulatory rules of the regulatory authority.

In some demonstrative embodiments, one or more exceptions may be applied to the ban, for example, if an owner of an AP whose identifier got flagged in a specific location is moving to another location, the ban may no longer be valid.

In some demonstrative embodiments, in addition to or instead of, the database described above, a Wi-Fi sniffer may be installed in a receiver of a licensed 6 GHZ device, and may send a signal (also referred to as a "kill signal"), e.g., a Wi-Fi signal or a common signal, including information to "kill" transmissions from a Wi-Fi interfering device.

In some demonstrative embodiments, the kill signal may include an identifier of the Wi-Fi interfering device that caused the interference, and, possibly, one or more channels that are now banned for transmissions, and optionally, a duration of the ban.

In some demonstrative embodiments, upon reception of the signal, the Wi-Fi interfering device shall cease any activity in the one or more identified channels.

In one example, the Wi-Fi interfering device may be a STA associated with an AP and the unique identifier may include an ID from the AP. According to this example, the Wi-Fi interfering device may send a Wi-Fi MAC frame to the AP, e.g., in order to relay the ban and/or to notify the AP of the ban. Upon reception of the Wi-Fi MAC frame, the AP shall cease activity in the one or more identified channels. In one example, the AP may move to another channel, e.g., using a channel switch procedure.

In some demonstrative embodiments, the kill signal may not contain any STA identifier, and any STA who receives the kill signal in the 6 GHz frequency band, e.g., at a power above a specific threshold, may stop transmitting in the 6 GHz wireless channel.

In some demonstrative embodiments, the kill signal may optionally include an indication of one or more channels that are banned for transmission, and, accordingly, no identifier may be required.

In some demonstrative embodiments, device 102 and/or 140 may impellent a mechanism to protect against DoS attacks using the kill signal, for example, to prevent misuse of the kill signal, e.g., as STAs may transmit such a kill signal to force their neighbor to vacate the channel.

In some demonstrative embodiments, a specific encryption with asymmetric keys may be applied to protect against misuse of the kill signal, e.g., as described below.

In some demonstrative embodiments, only incumbent devices having a specific private key may be allowed to transmit the kill signal. Any device may be able to decode the kill signal, e.g., using a public key, for example, if the signal is correctly encrypted with the private key. The incumbent devices may be able to get a specific private key to transmit a valid signal only through a regulatory authority, e.g., the FCC.

In some demonstrative embodiments, when using the regulatory database and the kill signal, e.g., as described above, reception of the kill signal may be accompanied by an update of the database. For example, when an unlicensed 6 GHZ device receives a kill signal, the unlicensed 6 GHZ device may connect to the database to check if the kill signal is real, e.g., a signal that has been vetted by regulatory bodies through the database, or if it is fake, e.g., from a DoS attack.

In some demonstrative embodiments, the kill signal may be transmitted from an incumbent to a WiFi device that is determined to cause interference.

In some demonstrative embodiments, the kill signal may be communicated as part of a MAC frame.

In some demonstrative embodiments, the kill signal may include a MAC public action frame carried, for example, in an IEEE802.11 PPDU format. In other embodiments, the kill signal may utilize any other frame format.

In some demonstrative embodiments, the kill signal may include an identifier, e.g., a unique identifier, of the WiFi device that is causing interference, and, optionally, one or more banned channels, and/or a duration of the ban.

In some demonstrative embodiments, if a non-AP STA, e.g., device 140, receives the kill signal, it may forward the kill signal to its serving AP, for example, via a Channel Ban Report frame, including the unique identifier, or any other frame.

In some demonstrative embodiments, upon reception of the kill signal from the incumbent, e.g., by the non-AP STA, or the report from the non-AP STA, e.g., by the AP, the AP that matches the identifier in the kill signal may cease any activity in the identified channels, e.g., the banned channels, and possibly select to move to another channel.

In some demonstrative embodiments, a licensed 6 GHz wireless communication device, e.g., an incumbent, for example, device 102, may be configured to broadcast a restriction signal including one or more restrictions with respect to the 6 GHz wireless frequency band, e.g., as described below.

In some demonstrative embodiments, a licensed 6 GHz wireless communication device, e.g., an incumbent emitter which may be protected under regulatory rules, when operating in a channel in the 6 GHz wireless frequency band, may periodically transmit a restriction signal including an incumbent identifier, for example, a unique incumbent identifier, e.g., as described below.

In one example, the incumbent identifier may be unique to an ID of the emitter, or to the emitter itself.

In some demonstrative embodiments, a transmission of the restriction signal may be conducted in any operation band, e.g., not necessarily the emitter operation band.

In some demonstrative embodiments, the incumbent identifier may be acquired by licensed devices that want to operate on the 6 GHz wireless frequency band.

In some demonstrative embodiments, the incumbent ID can be signed by a regulatory authority, e.g., the FCC.

In some demonstrative embodiments, an unlicensed device that operates in the 6 GHZ wireless frequency band, e.g., device 140, may be requested to perform an active or passive scanning to acquire all the relevant incumbents IDs and their restrictions.

In some demonstrative embodiments, the unlicensed device may be configured to select an operating band to communicate over the 6 GHz frequency band, for example, based on the restrictions from the incumbents.

In some demonstrative embodiments, the unlicensed device, e.g., device 140, may be configured to perform a periodic active or passive scanning to detect a new incumbent emitter.

In some demonstrative embodiments, an identifier, e.g., the ID of the unlicensed 6 GHZ STA, e.g., transmitted by device 140, and/or the incumbent ID, e.g., to be transmitted by device 102, may be generated in a manner to ensure protection and/or validity, e.g., as described below.

In some demonstrative embodiments, the identifier may be generated using asymmetric keys, e.g., as descried below. In other embodiments, the identifier may be generated using any other method and/or algorithm.

In some demonstrative embodiments, there may be a requirement to verify an identifier used in a message, which may force a device to change channel and/or to stop operation in a particular channel, e.g., in order to avoid DoS attacks.

In one example, the message may include the transmission transmitted by an unlicensed 6 GHZ STA, e.g., device 140, including the identifier of the unlicensed 6 GHZ STA.

In another example, the message may include the kill signal transmitted by an incumbent, e.g., device 102, to force an unlicensed 6 GHZ STA to stop operation in a particular band.

In another example, the message may include the restriction signal transmitted by an incumbent, e.g., device 102, including the one or more restrictions for communication over the 6 GHz band.

In some demonstrative embodiments, one or mechanisms may be defined to ensure protection and/or validity of the message. For example, the message may have an ID whose validity can be verified, e.g., as described below.

In some demonstrative embodiments, a transmitter, e.g., every transmitter, which is to generate a reliable ID, may be configured to generate an ID, and may send the ID to an authorization authority, e.g., for signing.

In some demonstrative embodiments, the authorization authority may sign the ID, for example, using a private key, and/or may create a private key signed ID Certificate from the ID.

In some demonstrative embodiments, the signed certificate may be configured to include a time stamp and the ID, e.g., compared to a signed ID, which may not be provide a reduced level of protection in some cases, for example, to protect against reply attacks.

In some demonstrative embodiments, a receiver of the signed certificate, e.g., device 102 to receive a message including the signed ID of the unlicensed 6 GHz STA, or device 140 to receive the kill signal including the signed incumbent ID, may use a public key to verify that the signed ID is valid and/or generated by the authorization authority.

In some demonstrative embodiments, an incumbent, e.g., device 102, may be configured to transmit a signal, e.g., a shut down signal, which may be configured to "shut down" unlicensed operation on a particular channel, e.g., as described below.

In some demonstrative embodiments, a licensed 6 GHZ device, for example, an incumbent, e.g., device 102, may be configured to transmit a signal including an indication of one or more wireless communication channels in the 6 GHz wireless frequency band, which are prohibited for transmission by unlicensed 6 GHz STAs, e.g., as described below.

In some demonstrative embodiments, the shut down signal may be configured to be detectable and/or decodable by unlicensed 6 GHz devices, for example, by all WiFi devices and/or any other unlicensed 6 GHz devices, e.g., as described below.

In some demonstrative embodiments, the shut down signal may be configured to be detectable, receivable, and/or decodable by one or more types of unlicensed 6 GHz devices, for example, by any unlicensed devices, for example, including WiFi devices, LTE-based devices, NR-based unlicensed interfaces, and the like.

In some demonstrative embodiments, controller 124 may be configured to trigger, cause, instruct and/or control device 102 to generate a signal configured for detection by an unlicensed 6 GHz STA, which is not licensed by the regulatory authority to communicate over the 6 GHz wireless frequency band, for example, device 140, e.g., as described below.

In some demonstrative embodiments, the signal may be configured to indicate one or more wireless communication channels in the 6 GHz wireless frequency band, which are prohibited for transmission by the unlicensed 6 GHz STA, e.g., as described below.

In some demonstrative embodiments, the signal may include a MAC frame according to an IEEE 802.11 Standard, e.g., as described below. In other embodiments, any other frame format may be used.

In some demonstrative embodiments, controller 124 may be configured to trigger, cause, instruct and/or control device 102 to transmit a predefined sequence over each of the one or more wireless communication channels in the 6 GHz wireless frequency band, e.g., as described below.

In some demonstrative embodiments, the predefined sequence may be configured to indicate that the one or more wireless communication channels in the 6 GHz wireless frequency band are prohibited for transmission by the unlicensed 6 GHz STA, e.g., as described below.

In some demonstrative embodiments, the signal may include a Legacy Short Training Field (L-STF) including the predefined sequence, e.g., as described below.

In some demonstrative embodiments, the L-STF may have a duration greater than 8 microseconds (ms), e.g., as described below.

In some demonstrative embodiments, the L-STF may have any other duration.

In other embodiments, the signal may include any other sequence, values and/or fields.

In some demonstrative embodiments, the signal may include a duration indication to indicate a duration during which the unlicensed 6 GHz STA is to be prohibited to transmit over the one or more wireless communication channels in the 6 GHz wireless frequency band.

In some demonstrative embodiments, the signal may include an identifier of the licensed 6 GHz wireless communication device from which the signal is transmitted, e.g., an identifier of device 102. For example, the signal may include the incumbent ID of device 102, e.g., as described above.

In some demonstrative embodiments, controller 124 may be configured to trigger, cause, instruct and/or control device 102 to transmit the signal, for example, in response to a detected transmission from the unlicensed 6 GHz STA over a wireless communication channel of the one or more wireless communication channels in the 6 GHz wireless frequency band, e.g., as described below.

In some demonstrative embodiments, controller 154 may be configured to trigger, cause, instruct and/or control device 140 to, based on receipt of the signal from receive 102, prohibit device 140 from transmitting over the one or more banned 6 Ghz wireless communication channels.

In some demonstrative embodiments, the signal may include an identifier of the unlicensed 6 GHz STA, e.g., as described below.

In one example, device 102 may transmit the signal in response to a detected transmission from device 140 over a wireless communication channel of the one or more wireless communication channels in the 6 GHz wireless frequency band. According to this example, the signal may include an identifier of device 140.

In some demonstrative embodiments, the signal may be configured to be detected by all Wi-Fi devices, when received. For example, the signal may indicate the one or more wireless communication channels in the 6 GHz wireless frequency band, which are prohibited for transmission by unlicensed 6 GHz devices.

In some demonstrative embodiments, the signal may be configured to be received by any unlicensed devices, e.g., Wi-Fi and LTE-based, or New-Radio-Based (NR-based) unlicensed interfaces, or any other unlicensed devices.

In one example, the signal may be configured for reception by Wi-Fi devices. For example, the signal may include a Wi-Fi frame carried using a Wi-Fi waveform, e.g., in accordance with an IEEE802.11a/b Standard.

In some demonstrative embodiments, the Wi-Fi frame may be configured to indicate a duration during which the one or more 6 GHz wireless communication channels are banned or prohibited. In one example, the duration may be infinite. In another example, the Wi-Fi frame may indicate a list of channels that are banned.

In some demonstrative embodiments, the signal may be transmitted in the form of a sequence, e.g., a simple known sequence, which may be sent with a specific bandwidth, for example, to fit a Wi-Fi channelization and/or any other bandwidth and/or channelization.

In some demonstrative embodiments, the sequence may be duplicated, for example, on each of the one or more 6 GHz wireless communication channels to be banned.

In one example, a signal including the sequence may be detectable, e.g., by the unlicensed 6 GHz devices, for example, even with a simple correlator on the receiver side.

In some demonstrative embodiments, the signal may be implemented in the form of a long L-STF, which may be generated, for example, in accordance with an L-STF of an IEEE 802.11 Standard. For example, the long L-STF may for longer time tan the L-STF of the IEEE 802.11 Standard, e.g., longer than 8 micro seconds (us). In one example, the long L-STF may have a duration of 1 milisecond (ms), or any other duration.

In some demonstrative embodiments, incumbents, e.g., device 102, may send the signal from a same location of their receiver and/or using a same beam as a beam they use for the receiver.

In some demonstrative embodiments, a Wi-Fi device, e.g., device 140, may not be allowed to transmit over the one or more channels of the 6 Ghz band, for example, if the WiFi device receives the signal with a power above a predefined power threshold.

In some demonstrative embodiments, a Wi-Fi device, e.g., device 140, that detects the signal, may be configured to inform its serving AP, for example, that it detected the signal and the channels that are banned by the detected signal, e.g., in an interference report frame or in any other frame.

In some demonstrative embodiments, the AP may be configured to, e.g., may be forced to, ban the channels based on the report from the WiFi device, e.g., upon reception of the interference report from the Wi-Fi device.

Figure 2:
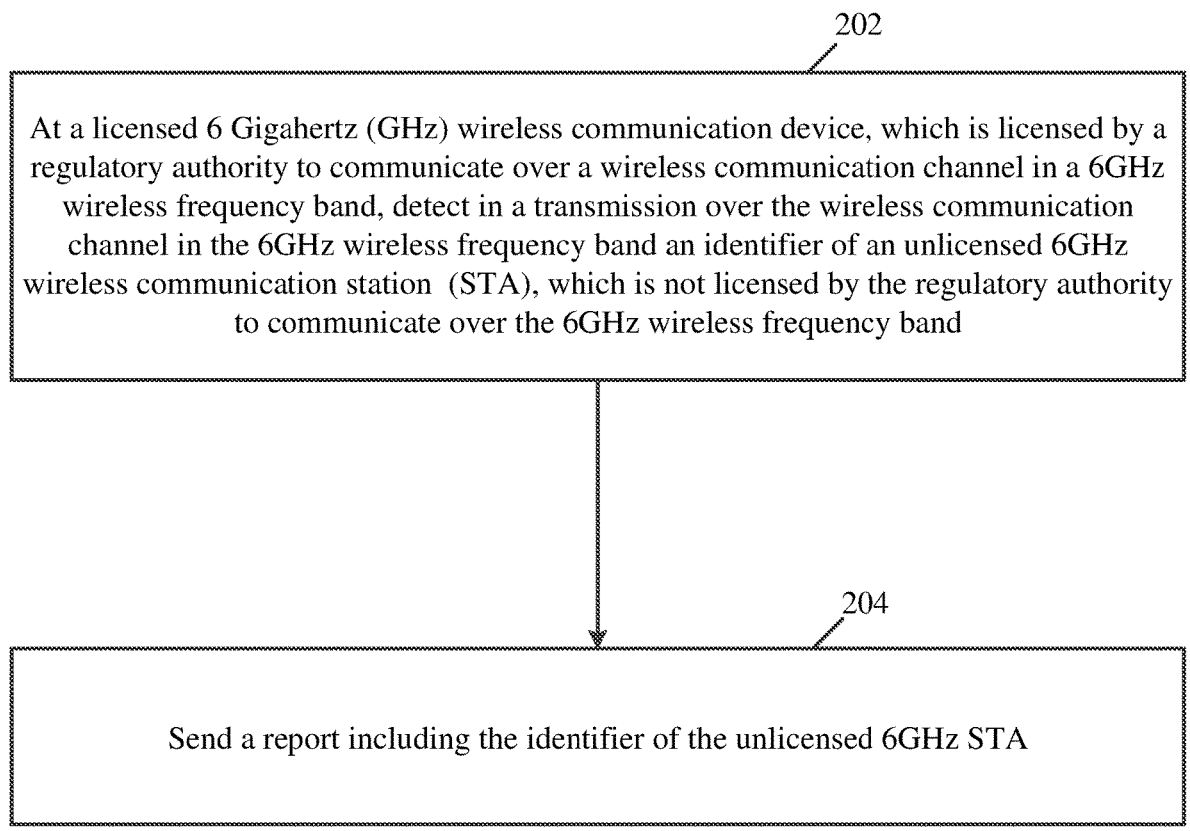
FIG. 2 is a schematic flow-chart illustration of a method of communication over a 6 Gigahertz (GHz) wireless frequency band, in accordance with some demonstrative embodiments.

Reference is made to FIG. 2, which schematically illustrates a method of communication over a 6 Ghz wireless frequency band, in accordance with some demonstrative embodiments. For example, one or more of the operations of the method of FIG. 2 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), a transmitter, e.g., transmitter 118 (FIG. 1) and/or transmitter 148 (FIG. 1), and/or a message processor, e.g., message processor 128 (FIG. 1) and/or message processor 158 (FIG. 1).

As indicated at block 202, the method may include detecting, at a licensed 6 Ghz wireless communication device, which is licensed by a regulatory authority to communicate over a wireless communication channel in a 6 GHz wireless frequency band, in a transmission over the wireless communication channel in the 6 GHz wireless frequency band an identifier of an unlicensed 6 GHz STA, which is not licensed by the regulatory authority to communicate over the 6 GHz wireless frequency band. For example, controller 124 (FIG. 1) may be configured to trigger, cause, instruct and/or control device 102 (FIG. 1) to detect in the transmission over the wireless communication channel in the 6 GHz wireless frequency band the identifier of device 140 (FIG. 1), e.g., as described above.

As indicated at block 204, the method may include sending a report including the identifier of the unlicensed 6 GHz STA. For example, controller 124 (FIG. 1) may be configured to trigger, cause, instruct and/or control device 102 (FIG. 1) to send the report including the identifier of device 140 (FIG. 1), e.g., as described above.

Figure 3:
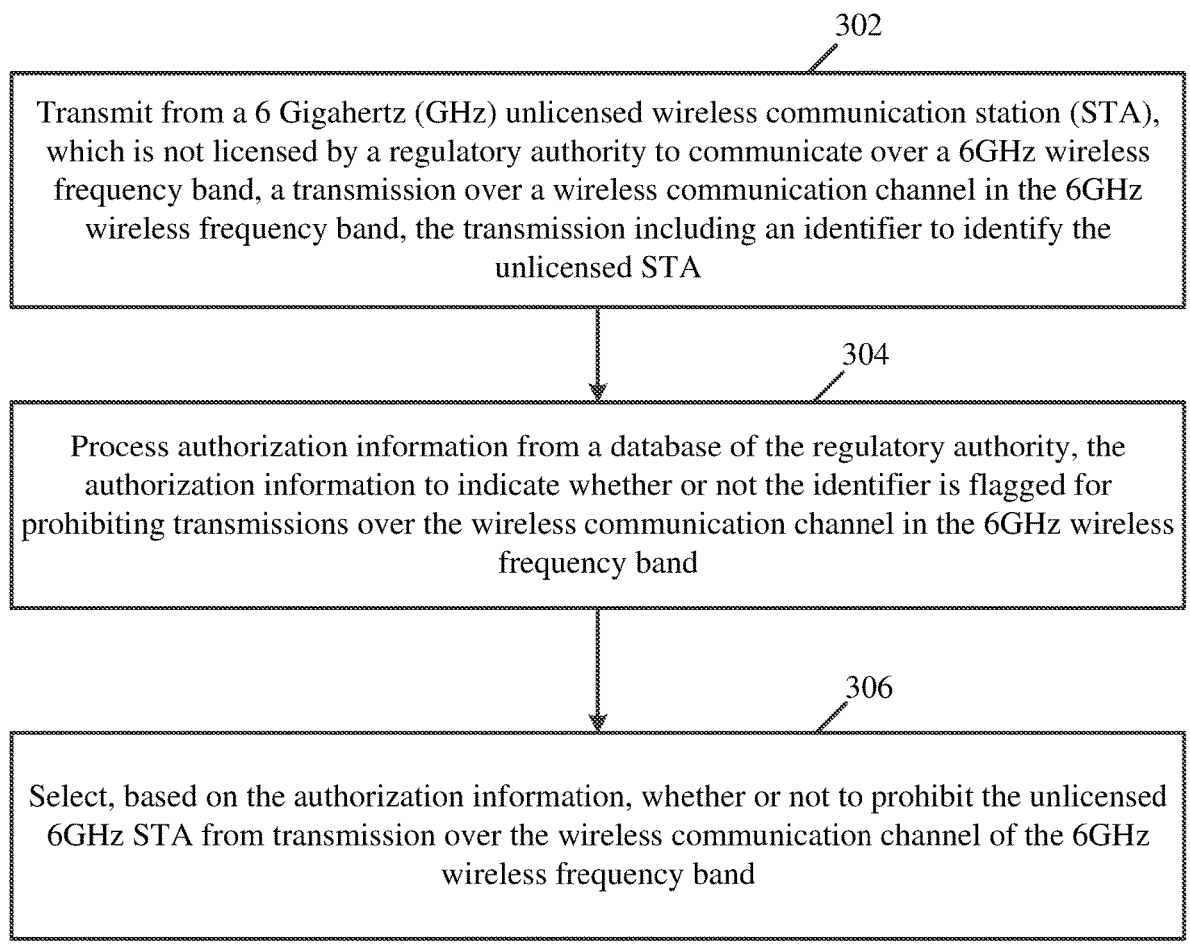
FIG. 3 is a schematic flow-chart illustration of a method of communication over a 6 GHz wireless frequency band, in accordance with some demonstrative embodiments.

Reference is made to FIG. 3, which schematically illustrates a method of communication over a 6 Ghz wireless frequency band, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), a transmitter, e.g., transmitter 118 (FIG. 1) and/or transmitter 148 (FIG. 1), and/or a message processor, e.g., message processor 128 (FIG. 1) and/or message processor 158 (FIG. 1).

As indicated at block 302, the method may include transmitting by an unlicensed 6 GHz STA, which is not licensed by a regulatory authority to communicate over a 6 GHz wireless frequency band, a transmission over a wireless communication channel in the 6 GHz wireless frequency band, the transmission including an identifier to identify the unlicensed 6 GHz STA. For example, controller 154 (FIG. 1) may be configured to trigger, cause, instruct and/or control device 140 (FIG. 1) to transmit over the wireless communication channel in the 6 GHz wireless frequency band the transmission including the identifier to identify device 140 (FIG. 1), e.g., as described above.

As indicated at block 304, the method may include processing authorization information from a database of the regulatory authority, the authorization information to indicate whether or not the identifier is flagged for prohibiting transmissions over the wireless communication channel in the 6 GHz wireless frequency band. For example, controller 154 (FIG. 1) may be configured to trigger, cause, instruct and/or control device 140 (FIG. 1) to process from the database of the regulatory authority the authorization information to indicate whether or not the identifier is flagged for prohibiting transmissions over the wireless communication channel in the 6 GHz wireless frequency band, e.g., as described above.

As indicated at block 306, the method may include, based on the authorization information, selecting whether or not to prohibit the unlicensed 6 GHz STA from transmission over the wireless communication channel of the 6 GHz wireless frequency band. For example, controller 154 (FIG. 1) may be configured to select whether or not to prohibit device 140 (FIG. 1) from transmission over the wireless communication channel of the 6 GHz wireless frequency band based on the authorization information, e.g., as described above.

Figure 4:
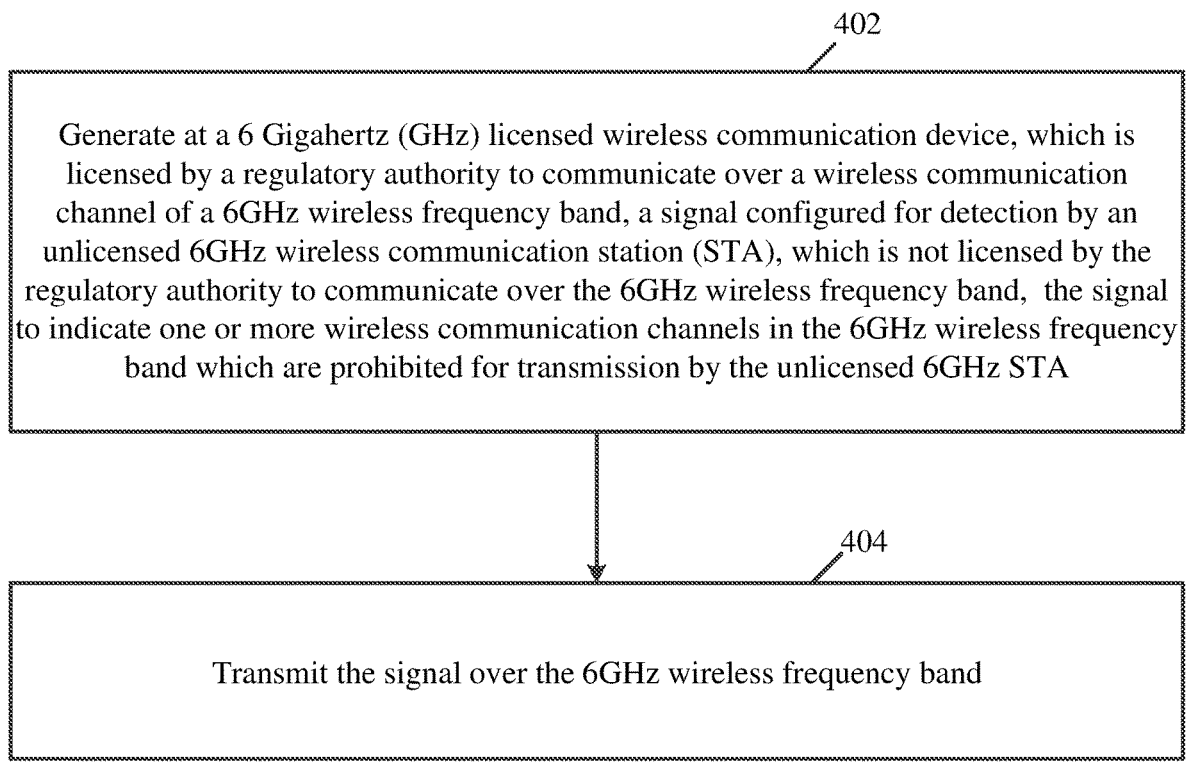
FIG. 4 is a schematic flow-chart illustration of a method of communication over a 6 GHz wireless frequency band, in accordance with some demonstrative embodiments.

Reference is made to FIG. 4, which schematically illustrates a method of communication over a 6 Ghz wireless frequency band, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), a transmitter, e.g., transmitter 118 (FIG. 1) and/or transmitter 148 (FIG. 1), and/or a message processor, e.g., message processor 128 (FIG. 1) and/or message processor 158 (FIG. 1).

As indicated at block 402, the method may include generating at a licensed 6 Ghz wireless communication device, which is licensed by a regulatory authority to communicate over a wireless communication channel in a 6 GHz wireless frequency band, a signal configured for detection by an unlicensed 6 GHz STA, which is not licensed by the regulatory authority to communicate over the 6 GHz wireless frequency band, the signal to indicate one or more wireless communication channels in the 6 GHz wireless frequency band which are prohibited for transmission by the unlicensed 6 GHz STA. For example, controller 124 (FIG. 1) may be configured to trigger, cause, instruct and/or control device 102 (FIG. 1) to generate the signal configured for detection by the unlicensed 6 GHz STA, the signal to indicate one or more wireless communication channels in the 6 GHz wireless frequency band which are prohibited for transmission by the unlicensed 6 GHz STA, e.g., as described above.

As indicated at block 404, the method may include transmitting the signal over the 6 GHz wireless frequency band. For example, controller 124 (FIG. 1) may be configured to trigger, cause, instruct and/or control device 102 (FIG. 1) to transmit the signal over the 6 GHz wireless frequency band, e.g., as described above.

Figure 5:
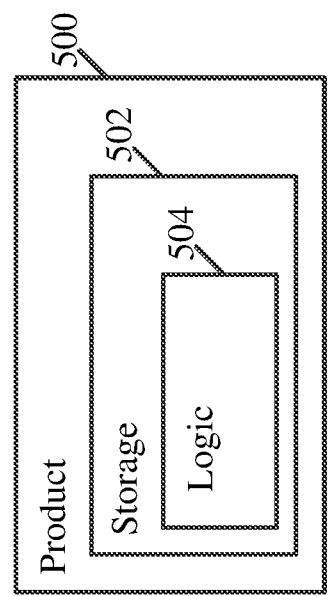
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable ("machine-readable") non-transitory transitory storage media 502, which may include computer-executable instructions, e.g., implemented by logic 504, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, and/or 4, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 500 and/or machine-readable storage media 502 may include one or more types of computer-readable storage media capable of storing data, including volatile memory, non-volatile memory, removable or non-removable memory, erasable or non-erasable memory, writeable or re-writeable memory, and the like. For example, machine-readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a licensed 6 Gigahertz (GHz) wireless communication device, which is licensed by a regulatory authority to communicate over a wireless communication channel in a 6 GHz wireless frequency band, to detect in a transmission over the wireless communication channel in the 6 GHz wireless frequency band an identifier of an unlicensed 6 GHz wireless communication station (STA), which is not licensed by the regulatory authority to communicate over the 6 GHz wireless frequency band; and send a report comprising the identifier of the unlicensed 6 GHz STA.

Example 2 includes the subject matter of Example 1, and optionally, wherein the apparatus is configured to cause the licensed 6 GHz wireless communication device to communicate over the wireless communication channel in the 6 GHz wireless frequency band according to a first wireless communication technology, and to process the transmission according to a second wireless communication technology different from the first wireless communication technology.

Example 3 includes the subject matter of any one of Examples 1 or 2, and optionally, wherein the apparatus is configured to cause the licensed 6 GHz wireless communication device to send the report to a regulatory database of the regulatory authority.

Example 4 includes the subject matter of any one of Examples 1-3, and optionally, wherein the apparatus is configured to cause the licensed 6 GHz wireless communication device to transmit the report in a frame to the unlicensed 6 GHz STA over the wireless communication channel in the 6 GHz wireless frequency band.

Example 5 includes the subject matter of any one of Examples 1-4, and optionally, wherein the apparatus is configured to cause the licensed 6 GHz wireless communication device to transmit a broadcast transmission comprising the report over the wireless communication channel in the 6 GHz wireless frequency band.

Example 6 includes the subject matter of any one of Examples 1-5, and optionally, wherein the report comprises an indication of the wireless communication channel in the 6 GHz wireless frequency band.

Example 7 includes the subject matter of any one of Examples 1-6, and optionally, wherein the report comprises a request that the unlicensed 6 GHz STA cease transmissions over the wireless communication channel in the 6 GHz wireless frequency band.

Example 8 includes the subject matter of any one of Examples 1-7, and optionally, wherein the report comprises a duration indication to indicate a duration during which the unlicensed 6 GHz STA is to be prohibited from transmitting over the wireless communication channel in the 6 GHz wireless frequency band.

Example 9 includes the subject matter of any one of Examples 1-8, and optionally, wherein the unlicensed 6 GHz STA comprises an Access Point (AP), the identifier comprising a Basic Service Set Identifier (BSSID) of the AP.

Example 10 includes the subject matter of any one of Examples 1-8, and optionally, wherein the identifier comprises a Basic Service Set Identifier (BSSID) of an Access Point (AP) associated with the unlicensed 6 GHz STA.

Example 11 includes the subject matter of any one of Examples 1-10, and optionally, wherein the identifier comprises a certified identifier signed by the regulatory authority.

Example 12 includes the subject matter of any one of Examples 1-11, and optionally, wherein the apparatus is configured to cause the licensed 6 GHz wireless communication device to select to send the report based on a detected power of the transmission.

Example 13 includes the subject matter of any one of Examples 1-12, and optionally, wherein the transmission is from the unlicensed 6 GHz STA.

Example 14 includes the subject matter of any one of Examples 1-13, and optionally, wherein the transmission comprises a Media Access Control (MAC) control frame according to an Institute of Electrical and Electronics Engineers (IEEE) 802.11 Standard.

Example 15 includes the subject matter of any one of Examples 1-13, and optionally, wherein the transmission comprises a Physical layer (PHY) Protocol Data Unit (PPDU).

Example 16 includes the subject matter of any one of Examples 1-15, and optionally, comprising a memory and a processor.

Example 17 includes a system of wireless communication comprising a licensed 6 Gigahertz (GHz) wireless communication device, which is licensed by a regulatory authority to communicate over a wireless communication channel in a 6 GHz wireless frequency band, the licensed 6 GHz wireless communication device comprising one or more antennas; a radio; a memory; a processor; and a controller configured to cause the licensed 6 GHz wireless communication device to detect in a transmission over the wireless communication channel in the 6 GHz wireless frequency band an identifier of an unlicensed 6 GHz wireless communication station (STA), which is not licensed by the regulatory authority to communicate over the 6 GHz wireless frequency band; and send a report comprising the identifier of the unlicensed 6 GHz STA.

Example 18 includes the subject matter of Example 17, and optionally, wherein the controller is configured to cause the licensed 6 GHz wireless communication device to communicate over the wireless communication channel in the 6 GHz wireless frequency band according to a first wireless communication technology, and to process the transmission according to a second wireless communication technology different from the first wireless communication technology.

Example 19 includes the subject matter of any one of Example 17 or 18, and optionally, wherein the controller is configured to cause the licensed 6 GHz wireless communication device to send the report to a regulatory database of the regulatory authority.

Example 20 includes the subject matter of any one of Examples 17-19, and optionally, wherein the controller is configured to cause the licensed 6 GHz wireless communication device to transmit the report in a frame to the unlicensed 6 GHz STA over the wireless communication channel in the 6 GHz wireless frequency band.

Example 21 includes the subject matter of any one of Examples 17-20, and optionally, wherein the controller is configured to cause the licensed 6 GHz wireless communication device to transmit a broadcast transmission comprising the report over the wireless communication channel in the 6 GHz wireless frequency band.

Example 22 includes the subject matter of any one of Examples 17-21, and optionally, wherein the report comprises an indication of the wireless communication channel in the 6 GHz wireless frequency band.

Example 23 includes the subject matter of any one of Examples 17-22, and optionally, wherein the report comprises a request that the unlicensed 6 GHz STA cease transmissions over the wireless communication channel in the 6 GHz wireless frequency band.

Example 24 includes the subject matter of any one of Examples 17-23, and optionally, wherein the report comprises a duration indication to indicate a duration during which the unlicensed 6 GHz STA is to be prohibited from transmitting over the wireless communication channel in the 6 GHz wireless frequency band.

Example 25 includes the subject matter of any one of Examples 17-24, and optionally, wherein the unlicensed 6 GHz STA comprises an Access Point (AP), the identifier comprising a Basic Service Set Identifier (BSSID) of the AP.

Example 26 includes the subject matter of any one of Examples 17-24, and optionally, wherein the identifier comprises a Basic Service Set Identifier (BSSID) of an Access Point (AP) associated with the unlicensed 6 GHz STA.

Example 27 includes the subject matter of any one of Examples 17-26, and optionally, wherein the identifier comprises a certified identifier signed by the regulatory authority.

Example 28 includes the subject matter of any one of Examples 17-27, and optionally, wherein the controller is configured to cause the licensed 6 GHz wireless communication device to select to send the report based on a detected power of the transmission.

Example 29 includes the subject matter of any one of Examples 17-28, and optionally, wherein the transmission is from the unlicensed 6 GHz STA.

Example 30 includes the subject matter of any one of Examples 17-29, and optionally, wherein the transmission comprises a Media Access Control (MAC) control frame according to an Institute of Electrical and Electronics Engineers (IEEE) 802.11 Standard.

Example 31 includes the subject matter of any one of Examples 17-29, and optionally, wherein the transmission comprises a Physical layer (PHY) Protocol Data Unit (PPDU).

Example 32 includes a method to be performed at a licensed 6 Gigahertz (GHz) wireless communication device, which is licensed by a regulatory authority to communicate over a wireless communication channel in a 6 GHz wireless frequency band, the method comprising detecting in a transmission over the wireless communication channel in the 6 GHz wireless frequency band an identifier of an unlicensed 6 GHz wireless communication station (STA), which is not licensed by the regulatory authority to communicate over the 6 GHz wireless frequency band; and sending a report comprising the identifier of the unlicensed 6 GHz STA.

Example 33 includes the subject matter of Example 32, and optionally, comprising communicating over the wireless communication channel in the 6 GHz wireless frequency band according to a first wireless communication technology, and processing the transmission according to a second wireless communication technology different from the first wireless communication technology.

Example 34 includes the subject matter of any one of Example 32 or 33, and optionally, comprising sending the report to a regulatory database of the regulatory authority.

Example 35 includes the subject matter of any one of Examples 32-34, and optionally, comprising transmitting the report in a frame to the unlicensed 6 GHz STA over the wireless communication channel in the 6 GHz wireless frequency band.

Example 36 includes the subject matter of any one of Examples 32-35, and optionally, comprising transmitting a broadcast transmission comprising the report over the wireless communication channel in the 6 GHz wireless frequency band.

Example 37 includes the subject matter of any one of Examples 32-36, and optionally, wherein the report comprises an indication of the wireless communication channel in the 6 GHz wireless frequency band.

Example 38 includes the subject matter of any one of Examples 32-37, and optionally, wherein the report comprises a request that the unlicensed 6 GHz STA cease transmissions over the wireless communication channel in the 6 GHz wireless frequency band.

Example 39 includes the subject matter of any one of Examples 32-38, and optionally, wherein the report comprises a duration indication to indicate a duration during which the unlicensed 6 GHz STA is to be prohibited from transmitting over the wireless communication channel in the 6 GHz wireless frequency band.

Example 40 includes the subject matter of any one of Examples 32-39, and optionally, wherein the unlicensed 6 GHz STA comprises an Access Point (AP), the identifier comprising a Basic Service Set Identifier (BSSID) of the AP.

Example 41 includes the subject matter of any one of Examples 32-39, and optionally, wherein the identifier comprises a Basic Service Set Identifier (BSSID) of an Access Point (AP) associated with the unlicensed 6 GHz STA.

Example 42 includes the subject matter of any one of Examples 32-41, and optionally, wherein the identifier comprises a certified identifier signed by the regulatory authority.

Example 43 includes the subject matter of any one of Examples 32-42, and optionally, comprising selecting to send the report based on a detected power of the transmission.

Example 44 includes the subject matter of any one of Examples 32-43, and optionally, wherein the transmission is from the unlicensed 6 GHz STA.

Example 45 includes the subject matter of any one of Examples 32-44, and optionally, wherein the transmission comprises a Media Access Control (MAC) control frame according to an Institute of Electrical and Electronics Engineers (IEEE) 802.11 Standard.

Example 46 includes the subject matter of any one of Examples 32-44, and optionally, wherein the transmission comprises a Physical layer (PHY) Protocol Data Unit (PPDU).

Example 47 includes a product comprising one or more tangible computer-readable non-transitory storage media comprising computer-executable instructions operable to, when executed by at least one processor, enable the at least one processor to cause a licensed 6 Gigahertz (GHz) wireless communication device, which is licensed by a regulatory authority to communicate over a wireless communication channel in a 6 GHz wireless frequency band, to detect in a transmission over the wireless communication channel in the 6 GHz wireless frequency band an identifier of an unlicensed 6 GHz wireless communication station (STA), which is not licensed by the regulatory authority to communicate over the 6 GHz wireless frequency band; and send a report comprising the identifier of the unlicensed 6 GHz STA.

Example 48 includes the subject matter of Example 47, and optionally, wherein the instructions, when executed, cause the licensed 6 GHz wireless communication device to communicate over the wireless communication channel in the 6 GHz wireless frequency band according to a first wireless communication technology, and to process the transmission according to a second wireless communication technology different from the first wireless communication technology.

Example 49 includes the subject matter of any one of Example 47 or 48, and optionally, wherein the instructions, when executed, cause the licensed 6 GHz wireless communication device to send the report to a regulatory database of the regulatory authority.

Example 50 includes the subject matter of any one of Examples 47-49, and optionally, wherein the instructions, when executed, cause the licensed 6 GHz wireless communication device to transmit the report in a frame to the unlicensed 6 GHz STA over the wireless communication channel in the 6 GHz wireless frequency band.

Example 51 includes the subject matter of any one of Examples 47-50, and optionally, wherein the instructions, when executed, cause the licensed 6 GHz wireless communication device to transmit a broadcast transmission comprising the report over the wireless communication channel in the 6 GHz wireless frequency band.

Example 52 includes the subject matter of any one of Examples 47-51, and optionally, wherein the report comprises an indication of the wireless communication channel in the 6 GHz wireless frequency band.

Example 53 includes the subject matter of any one of Examples 47-52, and optionally, wherein the report comprises a request that the unlicensed 6 GHz STA cease transmissions over the wireless communication channel in the 6 GHz wireless frequency band.

Example 54 includes the subject matter of any one of Examples 47-53, and optionally, wherein the report comprises a duration indication to indicate a duration during which the unlicensed 6 GHz STA is to be prohibited from transmitting over the wireless communication channel in the 6 GHz wireless frequency band.

Example 55 includes the subject matter of any one of Examples 47-54, and optionally, wherein the unlicensed 6 GHz STA comprises an Access Point (AP), the identifier comprising a Basic Service Set Identifier (BSSID) of the AP.

Example 56 includes the subject matter of any one of Examples 47-54, and optionally, wherein the identifier comprises a Basic Service Set Identifier (BSSID) of an Access Point (AP) associated with the unlicensed 6 GHz STA.

Example 57 includes the subject matter of any one of Examples 47-56, and optionally, wherein the identifier comprises a certified identifier signed by the regulatory authority.

Example 58 includes the subject matter of any one of Examples 47-57, and optionally, wherein the instructions, when executed, cause the licensed 6 GHz wireless communication device to select to send the report based on a detected power of the transmission.

Example 59 includes the subject matter of any one of Examples 47-58, and optionally, wherein the transmission is from the unlicensed 6 GHz STA.

Example 60 includes the subject matter of any one of Examples 47-59, and optionally, wherein the transmission comprises a Media Access Control (MAC) control frame according to an Institute of Electrical and Electronics Engineers (IEEE) 802.11 Standard.

Example 61 includes the subject matter of any one of Examples 47-59, and optionally, wherein the transmission comprises a Physical layer (PHY) Protocol Data Unit (PPDU).

Example 62 includes an apparatus of wireless communication by a licensed 6 Gigahertz (GHz) wireless communication device, which is licensed by a regulatory authority to communicate over a wireless communication channel in a 6 GHz wireless frequency band, the apparatus comprising means for detecting in a transmission over the wireless communication channel in the 6 GHz wireless frequency band an identifier of an unlicensed 6 GHz wireless communication station (STA), which is not licensed by the regulatory authority to communicate over the 6 GHz wireless frequency band; and means for sending a report comprising the identifier of the unlicensed 6 GHz STA.

Example 63 includes the subject matter of Example 62, and optionally, comprising means for communicating over the wireless communication channel in the 6 GHz wireless frequency band according to a first wireless communication technology, and processing the transmission according to a second wireless communication technology different from the first wireless communication technology.

Example 64 includes the subject matter of any one of Example 62 or 63, and optionally, comprising means for sending the report to a regulatory database of the regulatory authority.

Example 65 includes the subject matter of any one of Examples 62-64, and optionally, comprising means for transmitting the report in a frame to the unlicensed 6 GHz STA over the wireless communication channel in the 6 GHz wireless frequency band.

Example 66 includes the subject matter of any one of Examples 62-65, and optionally, comprising means for transmitting a broadcast transmission comprising the report over the wireless communication channel in the 6 GHz wireless frequency band.

Example 67 includes the subject matter of any one of Examples 62-66, and optionally, wherein the report comprises an indication of the wireless communication channel in the 6 GHz wireless frequency band.

Example 68 includes the subject matter of any one of Examples 62-67, and optionally, wherein the report comprises a request that the unlicensed 6 GHz STA cease transmissions over the wireless communication channel in the 6 GHz wireless frequency band.

Example 69 includes the subject matter of any one of Examples 62-68, and optionally, wherein the report comprises a duration indication to indicate a duration during which the unlicensed 6 GHz STA is to be prohibited from transmitting over the wireless communication channel in the 6 GHz wireless frequency band.

Example 70 includes the subject matter of any one of Examples 62-69, and optionally, wherein the unlicensed 6 GHz STA comprises an Access Point (AP), the identifier comprising a Basic Service Set Identifier (BSSID) of the AP.

Example 71 includes the subject matter of any one of Examples 62-69, and optionally, wherein the identifier comprises a Basic Service Set Identifier (BSSID) of an Access Point (AP) associated with the unlicensed 6 GHz STA.

Example 72 includes the subject matter of any one of Examples 62-71, and optionally, wherein the identifier comprises a certified identifier signed by the regulatory authority.

Example 73 includes the subject matter of any one of Examples 62-72, and optionally, comprising means for selecting to send the report based on a detected power of the transmission.

Example 74 includes the subject matter of any one of Examples 62-73, and optionally, wherein the transmission is from the unlicensed 6 GHz STA.

Example 75 includes the subject matter of any one of Examples 62-74, and optionally, wherein the transmission comprises a Media Access Control (MAC) control frame according to an Institute of Electrical and Electronics Engineers (IEEE) 802.11 Standard.

Example 76 includes the subject matter of any one of Examples 62-74, and optionally, wherein the transmission comprises a Physical layer (PHY) Protocol Data Unit (PPDU).

Example 77 includes an apparatus comprising circuitry and logic configured to cause an unlicensed 6 Gigahertz (GHz) wireless communication station (STA), which is not licensed by a regulatory authority to communicate over a 6 GHz wireless frequency band, to transmit a transmission over a wireless communication channel in the 6 GHz wireless frequency band, the transmission comprising an identifier to identify the unlicensed 6 GHz STA; process authorization information from a database of the regulatory authority, the authorization information to indicate whether or not the identifier is flagged for prohibiting transmissions over the wireless communication channel in the 6 GHz wireless frequency band; and based on the authorization information, select whether or not to prohibit the unlicensed 6 GHz STA from transmission over the wireless communication channel in the 6 GHz wireless frequency band.

Example 78 includes the subject matter of Example 77, and optionally, wherein the apparatus is configured to prohibit the unlicensed 6 GHz STA from transmission over the wireless communication channel in the 6 GHz wireless frequency band when the authorization information indicates the identifier is flagged for prohibiting transmissions over the wireless communication channel in the 6 GHz wireless frequency band.

Example 79 includes the subject matter of Example 77 or 78, and optionally, wherein the apparatus is configured to cause the unlicensed 6 GHz STA to access the database of the regulatory authority to receive the authorization information.

Example 80 includes the subject matter of any one of Examples 77-79, and optionally, wherein the apparatus is configured to cause the unlicensed 6 GHz STA to process a message from the regulatory authority, the message comprising the authorization information.

Example 81 includes the subject matter of any one of Examples 77-80, and optionally, wherein the apparatus is configured to cause the unlicensed 6 GHz STA to periodically transmit the transmission comprising the identifier over the wireless communication channel in the 6 GHz wireless frequency band.

Example 82 includes the subject matter of any one of Examples 77-81, and optionally, wherein the unlicensed 6 GHz STA comprises an Access Point (AP), the identifier comprising a Basic Service Set Identifier (BSSID) of the AP.

Example 83 includes the subject matter of any one of Examples 77-81, and optionally, wherein the identifier comprises a Basic Service Set Identifier (BSSID) of an Access Point (AP) associated with the unlicensed 6 GHz STA.

Example 84 includes the subject matter of any one of Examples 77-83, and optionally, wherein the transmission comprising the identifier comprises a Media Access Control (MAC) control frame according to an Institute of Electrical and Electronics Engineers (IEEE) 802.11 Standard.

Example 85 includes the subject matter of any one of Examples 77-83, and optionally, wherein the transmission comprising the identifier comprises a Physical layer (PHY) Protocol Data Unit (PPDU).

Example 86 includes the subject matter of any one of Examples 77-85, and optionally, comprising a memory and a processor.

Example 87 includes a system of wireless communication comprising an unlicensed 6 Gigahertz (GHz) wireless communication station (STA), which is not licensed by a regulatory authority to communicate over a 6 GHz wireless frequency band, the unlicensed 6 GHz STA comprising one or more antennas; a radio; a memory; a processor; and a controller configured to cause the unlicensed 6 GHz STA to transmit a transmission over a wireless communication channel in the 6 GHz wireless frequency band, the transmission comprising an identifier to identify the unlicensed 6 GHz STA; process authorization information from a database of the regulatory authority, the authorization information to indicate whether or not the identifier is flagged for prohibiting transmissions over the wireless communication channel in the 6 GHz wireless frequency band; and based on the authorization information, select whether or not to prohibit the unlicensed 6 GHz STA from transmission over the wireless communication channel in the 6 GHz wireless frequency band.

Example 88 includes the subject matter of Example 87, and optionally, wherein the controller is configured to prohibit the unlicensed 6 GHz STA from transmission over the wireless communication channel in the 6 GHz wireless frequency band when the authorization information indicates the identifier is flagged for prohibiting transmissions over the wireless communication channel in the 6 GHz wireless frequency band.

Example 89 includes the subject matter of Example 87 or 88, and optionally, wherein the controller is configured to cause the unlicensed 6 GHz STA to access the database of the regulatory authority to receive the authorization information.

Example 90 includes the subject matter of any one of Examples 87-89, and optionally, wherein the controller is configured to cause the unlicensed 6 GHz STA to process a message from the regulatory authority, the message comprising the authorization information.

Example 91 includes the subject matter of any one of Examples 87-90, and optionally, wherein the controller is configured to cause the unlicensed 6 GHz STA to periodically transmit the transmission comprising the identifier over the wireless communication channel in the 6 GHz wireless frequency band.

Example 92 includes the subject matter of any one of Examples 87-91, and optionally, wherein the unlicensed 6 GHz STA comprises an Access Point (AP), the identifier comprising a Basic Service Set Identifier (BSSID) of the AP.

Example 93 includes the subject matter of any one of Examples 87-91, and optionally, wherein the identifier comprises a Basic Service Set Identifier (BSSID) of an Access Point (AP) associated with the unlicensed 6 GHz STA.

Example 94 includes the subject matter of any one of Examples 87-93, and optionally, wherein the transmission comprising the identifier comprises a Media Access Control (MAC) control frame according to an Institute of Electrical and Electronics Engineers (IEEE) 802.11 Standard.

Example 95 includes the subject matter of any one of Examples 87-93, and optionally, wherein the transmission comprising the identifier comprises a Physical layer (PHY) Protocol Data Unit (PPDU).

Example 96 includes a method to be performed at an unlicensed 6 Gigahertz (GHz) wireless communication station (STA), which is not licensed by a regulatory authority to communicate over a 6 GHz wireless frequency band, the method comprising transmitting a transmission over a wireless communication channel in the 6 GHz wireless frequency band, the transmission comprising an identifier to identify the unlicensed 6 GHz STA; processing authorization information from a database of the regulatory authority, the authorization information to indicate whether or not the identifier is flagged for prohibiting transmissions over the wireless communication channel in the 6 GHz wireless frequency band; and based on the authorization information, selecting whether or not to prohibit the unlicensed 6 GHz STA from transmission over the wireless communication channel in the 6 GHz wireless frequency band.

Example 97 includes the subject matter of Example 96, and optionally, comprising prohibiting the unlicensed 6 GHz STA from transmission over the wireless communication channel in the 6 GHz wireless frequency band when the authorization information indicates the identifier is flagged for prohibiting transmissions over the wireless communication channel in the 6 GHz wireless frequency band.

Example 98 includes the subject matter of Example 96 or 97, and optionally, comprising accessing the database of the regulatory authority to receive the authorization information.

Example 99 includes the subject matter of any one of Examples 96-98, and optionally, comprising processing a message from the regulatory authority, the message comprising the authorization information.

Example 100 includes the subject matter of any one of Examples 96-99, and optionally, comprising periodically transmitting the transmission comprising the identifier over the wireless communication channel in the 6 GHz wireless frequency band.

Example 101 includes the subject matter of any one of Examples 96-100, and optionally, wherein the unlicensed 6 GHz STA comprises an Access Point (AP), the identifier comprising a Basic Service Set Identifier (BSSID) of the AP.

Example 102 includes the subject matter of any one of Examples 96-100, and optionally, wherein the identifier comprises a Basic Service Set Identifier (BSSID) of an Access Point (AP) associated with the unlicensed 6 GHz STA.

Example 103 includes the subject matter of any one of Examples 96-102, and optionally, wherein the transmission comprising the identifier comprises a Media Access Control (MAC) control frame according to an Institute of Electrical and Electronics Engineers (IEEE) 802.11 Standard.

Example 104 includes the subject matter of any one of Examples 96-102, and optionally, wherein the transmission comprising the identifier comprises a Physical layer (PHY) Protocol Data Unit (PPDU).

Example 105 includes a product comprising one or more tangible computer-readable non-transitory storage media comprising computer-executable instructions operable to, when executed by at least one processor, enable the at least one processor to cause an unlicensed 6 Gigahertz (GHz) wireless communication station (STA), which is not licensed by a regulatory authority to communicate over a 6 GHz wireless frequency band, to transmit a transmission over a wireless communication channel in the 6 GHz wireless frequency band, the transmission comprising an identifier to identify the unlicensed 6 GHz STA; process authorization information from a database of the regulatory authority, the authorization information to indicate whether or not the identifier is flagged for prohibiting transmissions over the wireless communication channel in the 6 GHz wireless frequency band; and based on the authorization information, select whether or not to prohibit the unlicensed 6 GHz STA from transmission over the wireless communication channel in the 6 GHz wireless frequency band.

Example 106 includes the subject matter of Example 105, and optionally, wherein the instructions, when executed, prohibit the unlicensed 6 GHz STA from transmission over the wireless communication channel in the 6 GHz wireless frequency band when the authorization information indicates the identifier is flagged for prohibiting transmissions over the wireless communication channel in the 6 GHz wireless frequency band.

Example 107 includes the subject matter of Example 105 or 106, and optionally, wherein the instructions, when executed, cause the unlicensed 6 GHz STA to access the database of the regulatory authority to receive the authorization information.

Example 108 includes the subject matter of any one of Examples 105-107, and optionally, wherein the instructions, when executed, cause the unlicensed 6 GHz STA to process a message from the regulatory authority, the message comprising the authorization information.

Example 109 includes the subject matter of any one of Examples 105-108, and optionally, wherein the instructions, when executed, cause the unlicensed 6 GHz STA to periodically transmit the transmission comprising the identifier over the wireless communication channel in the 6 GHz wireless frequency band.

Example 110 includes the subject matter of any one of Examples 105-109, and optionally, wherein the unlicensed 6 GHz STA comprises an Access Point (AP), the identifier comprising a Basic Service Set Identifier (BSSID) of the AP.

Example 111 includes the subject matter of any one of Examples 105-109, and optionally, wherein the identifier comprises a Basic Service Set Identifier (BSSID) of an Access Point (AP) associated with the unlicensed 6 GHz STA.

Example 112 includes the subject matter of any one of Examples 105-111, and optionally, wherein the transmission comprising the identifier comprises a Media Access Control (MAC) control frame according to an Institute of Electrical and Electronics Engineers (IEEE) 802.11 Standard.

Example 113 includes the subject matter of any one of Examples 105-111, and optionally, wherein the transmission comprising the identifier comprises a Physical layer (PHY) Protocol Data Unit (PPDU).

Example 114 includes an apparatus of wireless communication by an unlicensed 6 Gigahertz (GHz) wireless communication station (STA), which is not licensed by a regulatory authority to communicate over a 6 GHz wireless frequency band, the apparatus comprising means for transmitting a transmission over a wireless communication channel in the 6 GHz wireless frequency band, the transmission comprising an identifier to identify the unlicensed 6 GHz STA; means for processing authorization information from a database of the regulatory authority, the authorization information to indicate whether or not the identifier is flagged for prohibiting transmissions over the wireless communication channel in the 6 GHz wireless frequency band; and means for, based on the authorization information, selecting whether or not to prohibit the unlicensed 6 GHz STA from transmission over the wireless communication channel in the 6 GHz wireless frequency band.

Example 115 includes the subject matter of Example 114, and optionally, comprising means for prohibiting the unlicensed 6 GHz STA from transmission over the wireless communication channel in the 6 GHz wireless frequency band when the authorization information indicates the identifier is flagged for prohibiting transmissions over the wireless communication channel in the 6 GHz wireless frequency band.

Example 116 includes the subject matter of Example 114 or 115, and optionally, comprising means for accessing the database of the regulatory authority to receive the authorization information.

Example 117 includes the subject matter of any one of Examples 114-116, and optionally, comprising means for processing a message from the regulatory authority, the message comprising the authorization information.

Example 118 includes the subject matter of any one of Examples 114-117, and optionally, comprising means for periodically transmitting the transmission comprising the identifier over the wireless communication channel in the 6 GHz wireless frequency band.

Example 119 includes the subject matter of any one of Examples 114-118, and optionally, wherein the unlicensed 6 GHz STA comprises an Access Point (AP), the identifier comprising a Basic Service Set Identifier (BSSID) of the AP.

Example 120 includes the subject matter of any one of Examples 114-118, and optionally, wherein the identifier comprises a Basic Service Set Identifier (BSSID) of an Access Point (AP) associated with the unlicensed 6 GHz STA.

Example 121 includes the subject matter of any one of Examples 114-120, and optionally, wherein the transmission comprising the identifier comprises a Media Access Control (MAC) control frame according to an Institute of Electrical and Electronics Engineers (IEEE) 802.11 Standard.

Example 122 includes the subject matter of any one of Examples 114-120, and optionally, wherein the transmission comprising the identifier comprises a Physical layer (PHY) Protocol Data Unit (PPDU).

Example 123 includes an apparatus comprising circuitry and logic configured to cause a licensed 6 Gigahertz (GHz) wireless communication device, which is licensed by a regulatory authority to communicate over a wireless communication channel of a 6 GHz wireless frequency band, to generate a signal configured for detection by an unlicensed 6 GHz wireless communication station (STA), which is not licensed by the regulatory authority to communicate over the 6 GHz wireless frequency band, the signal to indicate one or more wireless communication channels in the 6 GHz wireless frequency band which are prohibited for transmission by the unlicensed 6 GHz STA; and transmit the signal over the 6 GHz wireless frequency band.

Example 124 includes the subject matter of Example 123, and optionally, wherein the signal comprises a Media Access Control (MAC) frame according to an Institute of Electrical and Electronics Engineers (IEEE) 802.11 Standard.

Example 125 includes the subject matter of Example 123 or 124, and optionally, wherein the apparatus is configured to cause the licensed 6 GHz device to transmit a predefined sequence over each of the one or more wireless communication channels in the 6 GHz wireless frequency band, the predefined sequence configured to indicate that the one or more wireless communication channels in the 6 GHz wireless frequency band are prohibited for transmission by the unlicensed 6 GHz STA.

Example 126 includes the subject matter of Example 125, and optionally, wherein the signal comprises a Legacy Short Training Field (L-STF) comprising the predefined sequence.

Example 127 includes the subject matter of Example 126, and optionally, wherein the L-STF has a duration greater than 8 microseconds.

Example 128 includes the subject matter of any one of Examples 123-127, and optionally, wherein the signal comprises a duration indication to indicate a duration during which the unlicensed 6 GHz STA is to be prohibited to transmit over the one or more wireless communication channels in the 6 GHz wireless frequency band.

Example 129 includes the subject matter of any one of Examples 123-128, and optionally, wherein the apparatus is configured to cause the licensed 6 GHz device to transmit the signal in response to a detected transmission from the unlicensed 6 GHz STA over a wireless communication channel of the one or more wireless communication channels in the 6 GHz wireless frequency band.

Example 130 includes the subject matter of any one of Examples 123-129, and optionally, wherein the signal comprises an identifier of the unlicensed 6 GHz STA.

Example 131 includes the subject matter of any one of Examples 123-130, and optionally, wherein the signal comprises an identifier of the licensed 6 GHz wireless communication device.

Example 132 includes the subject matter of any one of Examples 123-131, and optionally, comprising a memory and a processor.

Example 133 includes a system of wireless communication comprising a licensed 6 Gigahertz (GHz) wireless communication device, which is licensed by a regulatory authority to communicate over a wireless communication channel in a 6 GHz wireless frequency band, the licensed 6 GHz wireless communication device comprising one or more antennas; a radio; a memory; a processor; and a controller configured to cause the licensed 6 GHz wireless communication device to generate a signal configured for detection by an unlicensed 6 GHz wireless communication station (STA), which is not licensed by the regulatory authority to communicate over the 6 GHz wireless frequency band, the signal to indicate one or more wireless communication channels in the 6 GHz wireless frequency band which are prohibited for transmission by the unlicensed 6 GHz STA; and transmit the signal over the 6 GHz wireless frequency band.

Example 134 includes the subject matter of Example 133, and optionally, wherein the signal comprises a Media Access Control (MAC) frame according to an Institute of Electrical and Electronics Engineers (IEEE) 802.11 Standard.

Example 135 includes the subject matter of Example 133 or 134, and optionally, wherein the controller is configured to cause the licensed 6 GHz device to transmit a predefined sequence over each of the one or more wireless communication channels in the 6 GHz wireless frequency band, the predefined sequence configured to indicate that the one or more wireless communication channels in the 6 GHz wireless frequency band are prohibited for transmission by the unlicensed 6 GHz STA.

Example 136 includes the subject matter of Example 135, and optionally, wherein the signal comprises a Legacy Short Training Field (L-STF) comprising the predefined sequence.

Example 137 includes the subject matter of Example 136, and optionally, wherein the L-STF has a duration greater than 8 microseconds.

Example 138 includes the subject matter of any one of Examples 133-137, and optionally, wherein the signal comprises a duration indication to indicate a duration during which the unlicensed 6 GHz STA is to be prohibited to transmit over the one or more wireless communication channels in the 6 GHz wireless frequency band.

Example 139 includes the subject matter of any one of Examples 133-138, and optionally, wherein the controller is configured to cause the licensed 6 GHz device to transmit the signal in response to a detected transmission from the unlicensed 6 GHz STA over a wireless communication channel of the one or more wireless communication channels in the 6 GHz wireless frequency band.

Example 140 includes the subject matter of any one of Examples 133-139, and optionally, wherein the signal comprises an identifier of the unlicensed 6 GHz STA.

Example 141 includes the subject matter of any one of Examples 133-140, and optionally, wherein the signal comprises an identifier of the licensed 6 GHz wireless communication device.

Example 142 includes a method to be performed at a licensed 6 Gigahertz (GHz) wireless communication device, which is licensed by a regulatory authority to communicate over a wireless communication channel in a 6 GHz wireless frequency band, the method comprising generating a signal configured for detection by an unlicensed 6 GHz wireless communication station (STA), which is not licensed by the regulatory authority to communicate over the 6 GHz wireless frequency band, the signal to indicate one or more wireless communication channels in the 6 GHz wireless frequency band which are prohibited for transmission by the unlicensed 6 GHz STA; and transmitting the signal over the 6 GHz wireless frequency band.

Example 143 includes the subject matter of Example 142, and optionally, wherein the signal comprises a Media Access Control (MAC) frame according to an Institute of Electrical and Electronics Engineers (IEEE) 802.11 Standard.

Example 144 includes the subject matter of Example 142 or 143, and optionally, comprising transmitting a predefined sequence over each of the one or more wireless communication channels in the 6 GHz wireless frequency band, the predefined sequence configured to indicate that the one or more wireless communication channels in the 6 GHz wireless frequency band are prohibited for transmission by the unlicensed 6 GHz STA.

Example 145 includes the subject matter of Example 144, and optionally, wherein the signal comprises a Legacy Short Training Field (L-STF) comprising the predefined sequence.

Example 146 includes the subject matter of Example 145, and optionally, wherein the L-STF has a duration greater than 8 microseconds.

Example 147 includes the subject matter of any one of Examples 142-146, and optionally, wherein the signal comprises a duration indication to indicate a duration during which the unlicensed 6 GHz STA is to be prohibited to transmit over the one or more wireless communication channels in the 6 GHz wireless frequency band.

Example 148 includes the subject matter of any one of Examples 142-147, and optionally, comprising transmitting the signal in response to a detected transmission from the unlicensed 6 GHz STA over a wireless communication channel of the one or more wireless communication channels in the 6 GHz wireless frequency band.

Example 149 includes the subject matter of any one of Examples 142-148, and optionally, wherein the signal comprises an identifier of the unlicensed 6 GHz STA.

Example 150 includes the subject matter of any one of Examples 142-149, and optionally, wherein the signal comprises an identifier of the licensed 6 GHz wireless communication device.

Example 151 includes a product comprising one or more tangible computer-readable non-transitory storage media comprising computer-executable instructions operable to, when executed by at least one processor, enable the at least one processor to cause a licensed 6 Gigahertz (GHz) wireless communication device, which is licensed by a regulatory authority to communicate over a wireless communication channel in a 6 GHz wireless frequency band, to generate a signal configured for detection by an unlicensed 6 GHz wireless communication station (STA), which is not licensed by the regulatory authority to communicate over the 6 GHz wireless frequency band, the signal to indicate one or more wireless communication channels in the 6 GHz wireless frequency band which are prohibited for transmission by the unlicensed 6 GHz STA; and transmit the signal over the 6 GHz wireless frequency band.

Example 152 includes the subject matter of Example 151, and optionally, wherein the signal comprises a Media Access Control (MAC) frame according to an Institute of Electrical and Electronics Engineers (IEEE) 802.11 Standard.

Example 153 includes the subject matter of Example 151 or 152, and optionally, wherein the instructions, when executed, cause the licensed 6 GHz device to transmit a predefined sequence over each of the one or more wireless communication channels in the 6 GHz wireless frequency band, the predefined sequence configured to indicate that the one or more wireless communication channels in the 6 GHz wireless frequency band are prohibited for transmission by the unlicensed 6 GHz STA.

Example 154 includes the subject matter of Example 153, and optionally, wherein the signal comprises a Legacy Short Training Field (L-STF) comprising the predefined sequence.

Example 155 includes the subject matter of Example 154, and optionally, wherein the L-STF has a duration greater than 8 microseconds.

Example 156 includes the subject matter of any one of Examples 151-155, and optionally, wherein the signal comprises a duration indication to indicate a duration during which the unlicensed 6 GHz STA is to be prohibited to transmit over the one or more wireless communication channels in the 6 GHz wireless frequency band.

Example 157 includes the subject matter of any one of Examples 151-156, and optionally, wherein the instructions, when executed, cause the licensed 6 GHz device to transmit the signal in response to a detected transmission from the unlicensed 6 GHz STA over a wireless communication channel of the one or more wireless communication channels in the 6 GHz wireless frequency band.

Example 158 includes the subject matter of any one of Examples 151-157, and optionally, wherein the signal comprises an identifier of the unlicensed 6 GHz STA.

Example 159 includes the subject matter of any one of Examples 151-158, and optionally, wherein the signal comprises an identifier of the licensed 6 GHz wireless communication device.

Example 160 includes an apparatus of wireless communication by a licensed 6 Gigahertz (GHz) wireless communication device, which is licensed by a regulatory authority to communicate over a wireless communication channel in a 6 GHz wireless frequency band, the apparatus comprising means for generating a signal configured for detection by an unlicensed 6 GHz wireless communication station (STA), which is not licensed by the regulatory authority to communicate over the 6 GHz wireless frequency band, the signal to indicate one or more wireless communication channels in the 6 GHz wireless frequency band which are prohibited for transmission by the unlicensed 6 GHz STA; and means for transmitting the signal over the 6 GHz wireless frequency band.

Example 161 includes the subject matter of Example 160, and optionally, wherein the signal comprises a Media Access Control (MAC) frame according to an Institute of Electrical and Electronics Engineers (IEEE) 802.11 Standard.

Example 162 includes the subject matter of Example 160 or 161, and optionally, comprising means for transmitting a predefined sequence over each of the one or more wireless communication channels in the 6 GHz wireless frequency band, the predefined sequence configured to indicate that the one or more wireless communication channels in the 6 GHz wireless frequency band are prohibited for transmission by the unlicensed 6 GHz STA.

Example 163 includes the subject matter of Example 162, and optionally, wherein the signal comprises a Legacy Short Training Field (L-STF) comprising the predefined sequence.

Example 164 includes the subject matter of Example 163, and optionally, wherein the L-STF has a duration greater than 8 microseconds.

Example 165 includes the subject matter of any one of Examples 160-164, and optionally, wherein the signal comprises a duration indication to indicate a duration during which the unlicensed 6 GHz STA is to be prohibited to transmit over the one or more wireless communication channels in the 6 GHz wireless frequency band.

Example 166 includes the subject matter of any one of Examples 160-165, and optionally, comprising means for transmitting the signal in response to a detected transmission from the unlicensed 6 GHz STA over a wireless communication channel of the one or more wireless communication channels in the 6 GHz wireless frequency band.

Example 167 includes the subject matter of any one of Examples 160-166, and optionally, wherein the signal comprises an identifier of the unlicensed 6 GHz STA.

Example 168 includes the subject matter of any one of Examples 160-167, and optionally, wherein the signal comprises an identifier of the licensed 6 GHz wireless communication device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a licensed 6 Gigahertz (GHz) wireless communication device, which is licensed by a regulatory authority to communicate over a wireless communication channel in a 6 GHz wireless frequency band, to:
   detect in a transmission over the wireless communication channel in the 6 GHz wireless frequency band an identifier of an unlicensed 6 GHz wireless communication station (STA), which is not licensed by the regulatory authority to communicate over the 6 GHz wireless frequency band; and
   send a report comprising the identifier of the unlicensed 6 GHz STA.

2. The apparatus of claim 1 configured to cause the licensed 6 GHz wireless communication device to communicate over the wireless communication channel in the 6 GHz wireless frequency band according to a first wireless communication technology, and to process the transmission according to a second wireless communication technology different from the first wireless communication technology.

3. The apparatus of claim 1 configured to cause the licensed 6 GHz wireless communication device to send the report to a regulatory database of the regulatory authority.

4. The apparatus of claim 1 configured to cause the licensed 6 GHz wireless communication device to transmit the report in a frame to the unlicensed 6 GHz STA over the wireless communication channel in the 6 GHz wireless frequency band.

5. The apparatus of claim 1 configured to cause the licensed 6 GHz wireless communication device to transmit a broadcast transmission comprising the report over the wireless communication channel in the 6 GHz wireless frequency band.

6. The apparatus of claim 1, wherein the report comprises an indication of the wireless communication channel in the 6 GHz wireless frequency band.

7. The apparatus of claim 1, wherein the report comprises a request that the unlicensed 6 GHz STA cease transmissions over the wireless communication channel in the 6 GHz wireless frequency band.

8. The apparatus of claim 1, wherein the report comprises a duration indication to indicate a duration during which the unlicensed 6 GHz STA is to be prohibited from transmitting over the wireless communication channel in the 6 GHz wireless frequency band.

9. The apparatus of claim 1, wherein the identifier comprises a certified identifier signed by the regulatory authority.

10. The apparatus of claim 1 configured to cause the licensed 6 GHz wireless communication device to select to send the report based on a detected power of the transmission.

11. The apparatus of claim 1, wherein the transmission comprises a Media Access Control (MAC) control frame according to an Institute of Electrical and Electronics Engineers (IEEE) 802.11 Standard.

12. The apparatus of claim 1 comprising a memory, a processor, a radio, and one or more antennas.

13. An apparatus comprising circuitry and logic configured to cause an unlicensed 6 Gigahertz (GHz) wireless communication station (STA), which is not licensed by a regulatory authority to communicate over a 6 GHz wireless frequency band, to:
   transmit a transmission over a wireless communication channel in the 6 GHz wireless frequency band, the transmission comprising an identifier to identify the unlicensed 6 GHz STA;
   process authorization information from a database of the regulatory authority, the authorization information to indicate whether or not the identifier is flagged for prohibiting transmissions over the wireless communication channel in the 6 GHz wireless frequency band; and
   based on the authorization information, select whether or not to prohibit the unlicensed 6 GHz STA from transmission over the wireless communication channel in the 6 GHz wireless frequency band.

14. The apparatus of claim 13 configured to prohibit the unlicensed 6 GHz STA from transmission over the wireless communication channel in the 6 GHz wireless frequency band when the authorization information indicates the identifier is flagged for prohibiting transmissions over the wireless communication channel in the 6 GHz wireless frequency band.

15. The apparatus of claim 13 configured to cause the unlicensed 6 GHz STA to access the database of the regulatory authority to receive the authorization information.

16. The apparatus of claim 13 configured to cause the unlicensed 6 GHz STA to periodically transmit the transmission comprising the identifier over the wireless communication channel in the 6 GHz wireless frequency band.

17. The apparatus of claim 13 comprising a memory, a processor, a radio, and one or more antennas.

18. An apparatus comprising circuitry and logic configured to cause a licensed 6 Gigahertz (GHz) wireless communication device, which is licensed by a regulatory authority to communicate over a wireless communication channel of a 6 GHz wireless frequency band, to:
   generate a signal configured for detection by an unlicensed 6 GHz wireless communication station (STA), which is not licensed by the regulatory authority to communicate over the 6 GHz wireless frequency band, the signal to indicate one or more wireless communication channels in the 6 GHz wireless frequency band which are prohibited for transmission by the unlicensed 6 GHz STA; and
   transmit the signal over the 6 GHz wireless frequency band.

19. The apparatus of claim 18, wherein the signal comprises a Media Access Control (MAC) frame according to an Institute of Electrical and Electronics Engineers (IEEE) 802.11 Standard.

20. The apparatus of claim 18 configured to cause the licensed 6 GHz device to transmit a predefined sequence over each of the one or more wireless communication channels in the 6 GHz wireless frequency band, the predefined sequence configured to indicate that the one or more wireless communication channels in the 6 GHz wireless frequency band are prohibited for transmission by the unlicensed 6 GHz STA.

21. The apparatus of claim 20, wherein the signal comprises a Legacy Short Training Field (L-STF) comprising said predefined sequence.

22. The apparatus of claim 21, wherein the L-STF has a duration greater than 8 microseconds.

23. The apparatus of claim 18, wherein the signal comprises a duration indication to indicate a duration during which the unlicensed 6 GHz STA is to be prohibited to transmit over the one or more wireless communication channels in the 6 GHz wireless frequency band.

24. The apparatus of claim 18 configured to cause the licensed 6 GHz device to transmit the signal in response to a detected transmission from the unlicensed 6 GHz STA over a wireless communication channel of the one or more wireless communication channels in the 6 GHz wireless frequency band.

25. The apparatus of claim 18, wherein the signal comprises an identifier of the unlicensed 6 GHz STA.

* * * * *